US009725288B2

(12) United States Patent
Koyama

(10) Patent No.: US 9,725,288 B2
(45) Date of Patent: Aug. 8, 2017

(54) STACKER CRANE

(71) Applicant: MURATA MACHINERY, LTD., Kyoto-shi, Kyoto (JP)

(72) Inventor: Yoichiro Koyama, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 393 days.

(21) Appl. No.: 14/424,134

(22) PCT Filed: Aug. 22, 2013

(86) PCT No.: PCT/JP2013/072372
§ 371 (c)(1),
(2) Date: Feb. 26, 2015

(87) PCT Pub. No.: WO2014/038383
PCT Pub. Date: Mar. 13, 2014

(65) Prior Publication Data
US 2015/0225216 A1 Aug. 13, 2015

(30) Foreign Application Priority Data
Sep. 5, 2012 (JP) ................................. 2012-194766

(51) Int. Cl.
*B66F 9/07* (2006.01)
*B65G 1/04* (2006.01)
(52) U.S. Cl.
CPC ............ *B66F 9/072* (2013.01); *B65G 1/0407* (2013.01); *B66F 9/07* (2013.01)
(58) Field of Classification Search
CPC ......... B66G 9/07; B66G 9/072; B65G 1/0407
See application file for complete search history.

(56) References Cited

U.S. PATENT DOCUMENTS 5,564,528 A * 10/1996 Goto .................. B66F 9/072
187/261
7,721,654 B2 * 5/2010 Ueda .................. B66F 9/072
104/106
(Continued)

FOREIGN PATENT DOCUMENTS

JP    EP 0586796 A1 * 3/1994 .............. B66F 9/072
JP    11-189309 A    7/1999
(Continued)

OTHER PUBLICATIONS

Official Communication issued in International Patent Application No. PCT/JP2013/072372, mailed on Nov. 19, 2013.
(Continued)

Primary Examiner — Zachary Kuhfuss
(74) Attorney, Agent, or Firm — Keating & Bennett, LLP

(57) ABSTRACT

First and second masts of a stacker crane are arrayed in an X direction and extend vertically. Connecting plates are mounted at lower portions and on both side surfaces, facing a Y direction, of the first and second masts, each including an upper portion fixed to the first or second masts, and a lower portion whose width in the X direction is greater than that of the upper portion. First and second lower hollow frames include a pair of hollow members disposed on both sides of the first and second masts in the Y direction and extending in the X direction and are fixed to the lower portions of the connecting plates. Travelling wheels are supported by the connecting plates and roll on a lower guide rail.

9 Claims, 19 Drawing Sheets

(56) References Cited

U.S. PATENT DOCUMENTS

| | | |
|---|---|---|
| 2004/0042887 A1 | 3/2004 | Tai et al. |
| 2006/0060106 A1* | 3/2006 | Ueda ........................ B66F 9/072 |
| | | 105/144 |
| 2006/0102433 A1 | 5/2006 | Ueda |
| 2012/0168255 A1 | 7/2012 | Iwata |
| 2015/0210519 A1* | 7/2015 | Koyama .............. B65G 1/0407 |
| | | 105/26.05 |
| 2015/0225217 A1* | 8/2015 | Koyama ................. B66F 9/072 |
| | | 187/244 |
| 2015/0225220 A1* | 8/2015 | Koyama ................... B66F 9/07 |
| | | 187/266 |
| 2015/0353281 A1* | 12/2015 | Tanaka .................... B66F 9/072 |
| | | 187/240 |

FOREIGN PATENT DOCUMENTS

| | | |
|---|---|---|
| JP | 2003-237909 A | 8/2003 |
| JP | 2004-034913 A | 2/2004 |
| JP | 2009-269729 A | 11/2009 |

OTHER PUBLICATIONS

English translation of Official Communication issued in corresponding International Application PCT/JP2013/072372, mailed on Mar. 5, 2015.

\* cited by examiner

STACKER CRANE

BACKGROUND OF THE INVENTION

1. Field of the Invention

The present invention relates to a stacker crane.

2. Description of the Related Art

A conventional automated warehouse includes, for example, a pair of racks, a stacker crane, a warehousing station, and a delivery station. The pair of racks is spaced apart by a prescribed spacing in the forward-rearward direction. The stacker crane is provided moveably in the left-right direction between the front and rear racks. The warehousing station is disposed on a side of one of the racks. The delivery station is disposed on a side of the other one of the racks. The racks have numerous article storage shelves at the top, bottom, left, and right.

The stacker crane includes a travelling truck, a lift platform that is freely elevatable along a mast provided to the travelling truck, and an article transfer apparatus (e.g., a slide fork that is slidably provided in the forward-rearward direction) that is provided to the lift platform. The travelling truck principally includes a lower frame that is guided by and travels along a travelling rail (e.g., refer to Japanese Unexamined Patent Application Publication No. 2003-237909). The lower frame has a pair of parallel side frames, the side frames being linked to one another at a center portion in the longitudinal direction.

The mast and the lower frame of a conventional stacker crane are bolted to one another by a flange. In addition, reinforcing ribs are welded to the mast. A lifting drive mechanism (including a lifting drive motor) is welded to the mast, and a wheel is joined, as a wheel unit, to the lower frame.

In recent years, there has been a demand to achieve high performance in stacker cranes (high speed performance and high acceleration-deceleration performance of the crane). Furthermore, achieving such performance also increases the stress that acts upon a mast base portion, and therefore there is also a demand for reinforcing ribs that are strong. However, simply increasing the strength of the reinforcing ribs constrains the attachment of the lifting drive portion and the wheels due to the enlarged reinforcing ribs.

SUMMARY OF THE INVENTION

Preferred embodiments of the present invention significantly reduce or prevent stress acting upon a base portion of a mast of a stacker crane by using a simple, space saving structure.

A plurality of aspects of various preferred embodiments of the present invention will be described below. These aspects are capable of being arbitrarily combined as necessary or desired.

A stacker crane according to a first aspect of various preferred embodiments of the present invention is a stacker crane that travels along a rail. The stacker crane includes a first mast, a second mast, connecting plates, a first lower hollow frame, and a second lower hollow frame.

The first mast and the second mast are spaced apart from one another in a travel direction and extend vertically.

The connecting plates include a plate-shaped first plate and a plate-shaped second plate mounted to a lower portion and both side surfaces, which face a crossing direction crossing the travelling direction, of the first mast, and a plate-shaped third plate and a plate-shaped fourth plate mounted to a lower portion and both side surfaces, which face the crossing direction, of the second mast. The first plate and the second plate each include an upper portion fixed to the first mast and a lower portion whose width in the travelling direction is greater than that of the upper portion. The third plate and the fourth plate each include an upper portion fixed to the second mast and a lower portion whose width in the travelling direction is greater than that of the upper portion.

The first lower hollow frame and the second lower hollow frame include a pair of hollow members disposed on outer sides of the connecting plates in the crossing direction on both sides of the first mast and the second mast in the crossing direction and extending in the travelling direction. The first lower hollow frame includes a first end fixed to an outer side surface of the lower portion of the first plate in the crossing direction and a second end fixed to an outer side surface of the lower portion of the third plate in the crossing direction. The second lower hollow frame includes a first end fixed to an outer side surface of the lower portion of the second plate in the crossing direction and a second end fixed to an outer side surface of the lower portion of the fourth plate in the crossing direction.

In this stacker crane, the first mast and the second mast are connected to the first lower hollow frame and the second lower hollow frame by the connecting plates. The connecting plates define and function as ribs that support the masts. Accordingly, the stress that acts upon the masts is significantly reduced or prevented. As a result, the stacker crane supports higher performance.

The stacker crane preferably further includes a travelling wheel unit supported by the connecting plate and configured to roll on a top surface of the rail, and a drive wheel unit configured to make contact with a side surface of the rail.

In this stacker crane, the drive wheel unit makes contact with the side surface of the rail, and, in response, the travelling wheel unit, which defines and serves as a follower wheel, rolls on the rail. Accordingly, the stress that acts upon the connecting plate is significantly reduced or prevented.

The travelling wheel unit preferably includes a first travelling wheel and a second travelling wheel spaced apart from one another in the travelling direction. Both shaft ends of the first travelling wheel are rotatably supported by the first plate and the second plate. Both shaft ends of the second travelling wheel are rotatably supported by the third plate and the fourth plate.

The drive wheel unit preferably includes a pair of first drive wheels provided at the first ends of the first lower hollow frame and the second lower hollow frame, and a pair of second drive wheels provided at the second ends of the first lower hollow frame and the second lower hollow frame.

A notch that opens downward preferably is provided in a lower portion of the connecting plate. The stacker crane preferably further includes a roller attached to the notch and configured to prevent the first lower hollow frame and the second lower hollow frame from floating up from the rail.

In the stacker crane, the attachment of the floating prevention roller to the notch of the connecting plate from below and the detachment of the roller from the connecting plate downward are easy. Thus, the inspection and replacement of the floating prevention rollers become easy.

The stacker crane further includes a lift platform, a belt, and a lifting drive motor. The lift platform is movable along the first mast and the second mast. The belt is attached to the lift platform. The lifting drive motor is a motor configured to drive the belt and is mounted in a state tilted with respect to the connecting plate.

In this stacker crane, the lifting drive motor is mounted to the connecting plate, and therefore the stress that acts on the mast is significantly reduced. In addition, because the attitude of the lifting drive motor is in a tilted state, space saving is achieved.

The stacker crane preferably further includes a controller and a support member. The support member, to which the controller is attached, preferably is fixed to the connecting plate.

In this stacker crane, the controller preferably is mounted to the connecting plate via the support member. Accordingly, space saving is achieved.

In the stacker crane according to various preferred embodiments of the present invention, the stress that acts upon a base portion of a mast is significantly reduced or prevented by using a simple, space saving structure.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A stacker crane 1 is an article transfer apparatus that preferably travels inside an automated warehouse (not shown), for example. Below, the travelling direction of the stacker crane 1 is the X direction, and the width direction of the stacker crane 1 is the Y direction (crossing direction that cross the travelling direction). In addition, the vertical direction is the Z direction.

A pair of racks (not shown) is disposed on both sides of the stacker crane 1, one on each side, in the width direction (Y direction). The pair of racks is disposed to sandwich a travel passageway of the stacker crane 1. The pair of racks include a plurality of article storage shelves (not shown), and articles are loaded on the shelves. A warehousing station (not shown) configured to warehouse the articles is disposed at a lowermost tier of one of the racks, and a delivery station (not shown) configured to deliver the articles is disposed at a lowermost tier of the other rack.

Figure 1:
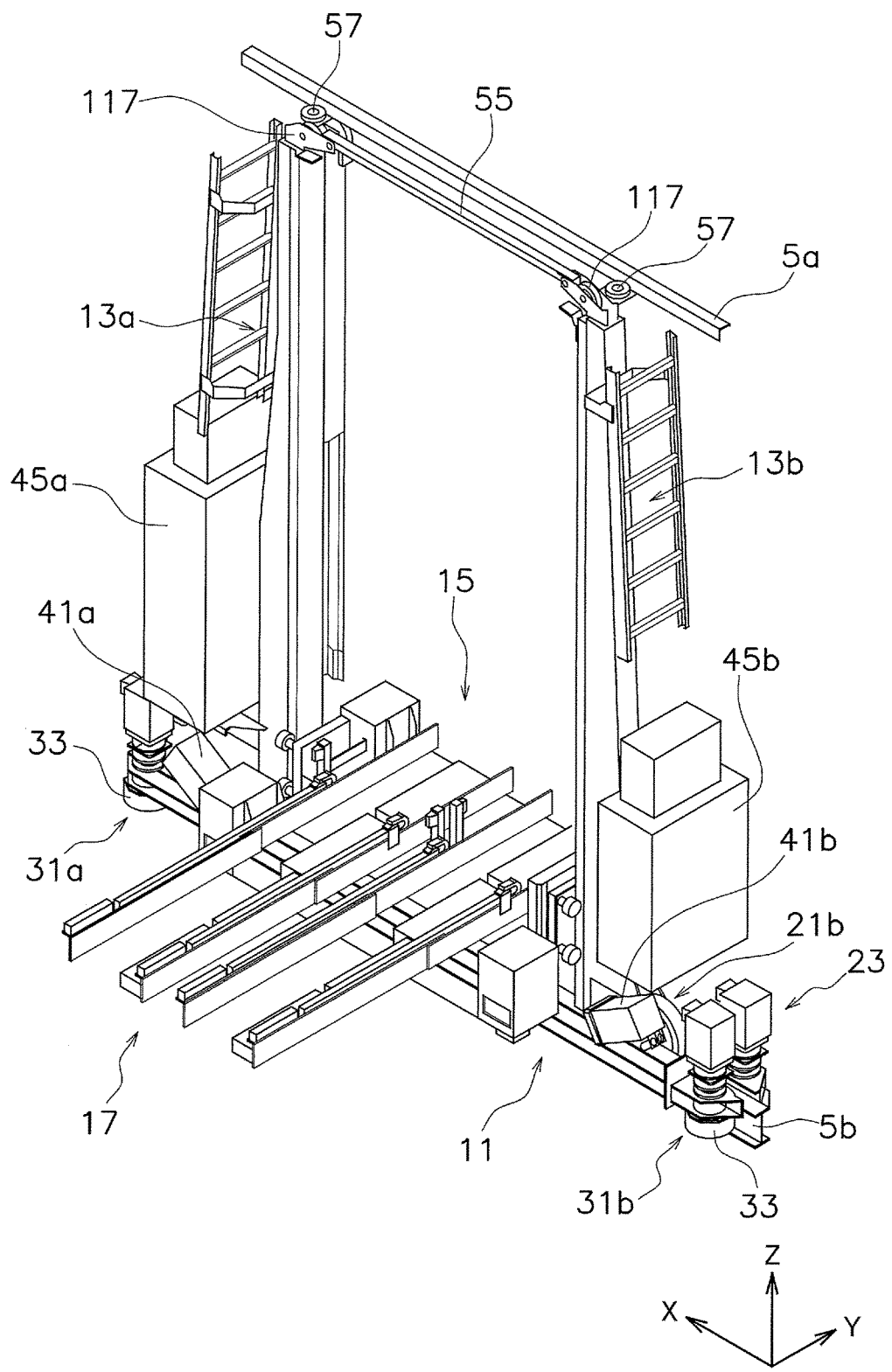
FIG. 1 is an oblique view of a stacker crane.
Figure 2:
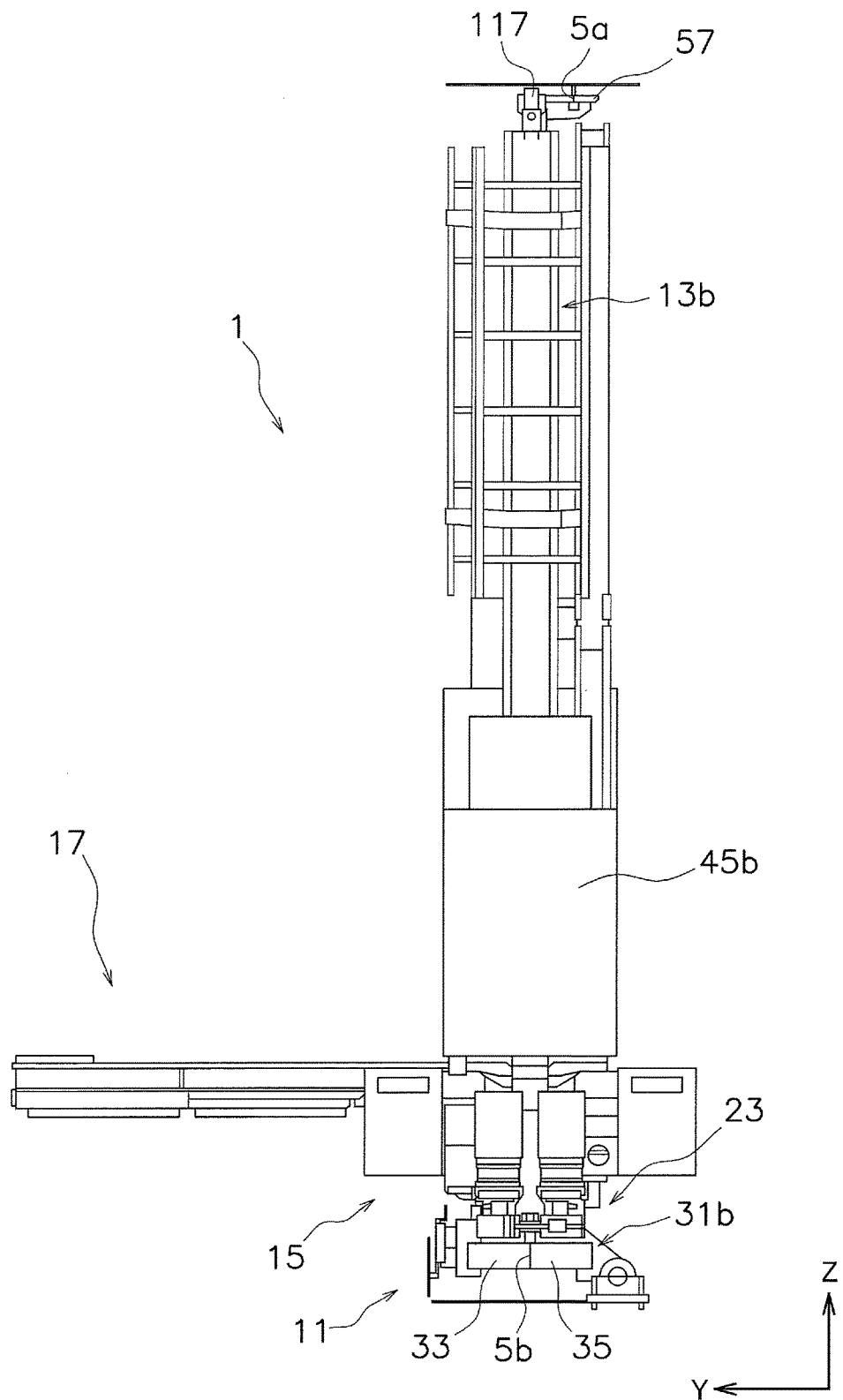
FIG. 2 is a side view of the stacker crane.

As shown in FIG. 1 and FIG. 2, an upper guide rail 5a and a lower guide rail 5b, which extend in the X direction along the travel passageway, are provided inside the automated warehouse. The upper guide rail 5a preferably is a plate-shaped member that extends perpendicularly or substantially perpendicularly downward. As shown in FIG. 4, FIG. 10, FIG. 11, and FIG. 12, the lower guide rail 5b preferably is I-shaped in a crossing section and includes an erect portion 5c and a horizontal portion 5d. In greater detail, an upper portion of the lower guide rail 5b preferably is T-shaped. The stacker crane 1 is guided moveably along the upper guide rail 5a and the lower guide rail 5b. The stacker crane 1 is configured to convey articles to and from the plurality of shelves, the warehousing station, and the delivery station.

Figure 3:
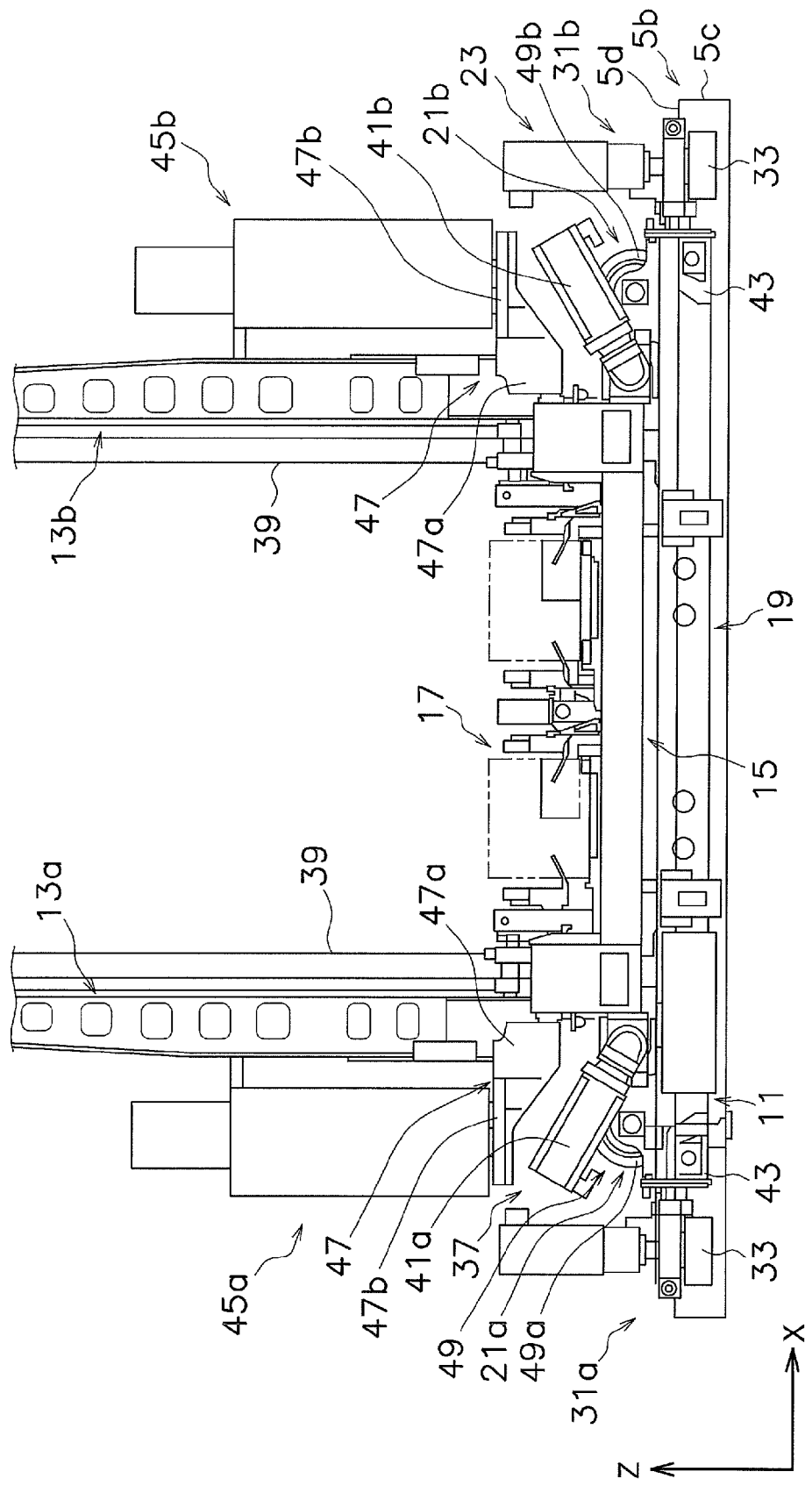
FIG. 3 is a front view of a lower of the stacker crane.

As shown in FIG. 1, FIG. 2, and FIG. 3, the stacker crane 1 includes a travelling vehicle 11, a first mast 13a, a second mast 13b, and a lift platform 15.

The first mast 13a and the second mast 13b are members configured to raise and lower the lift platform 15. The first mast 13a and the second mast 13b are spaced apart in the X direction. More specifically, the first mast 13a and the second mast 13b are disposed such that they sandwich the lift platform 15 in the X direction. The first mast 13a and the second mast 13b extend in the Z direction.

The travelling vehicle 11 is configured to move the first mast 13a, the second mast 13b, and the lift platform 15. The travelling vehicle 11 includes a travelling vehicle main body 19, a first travelling wheel unit 21a, a second travelling wheel unit 21b, and a travelling drive mechanism 23.

The travelling vehicle main body 19 defines a portion of the travelling vehicle 11. As shown in FIG. 5, FIG. 6, FIG. 7, and FIG. 8, the travelling vehicle main body 19 includes a first lower frame 25a and a second lower frame 25b. The first lower frame 25a and the second lower frame 25b are arrayed in the Y direction and extend in the X direction.

The first lower frame 25a and the second lower frame 25b preferably have line symmetry and have the same structure. The first lower frame 25a includes a first lower hollow frame 27a and two connecting plates 29 (discussed later). The second lower frame 25b includes a second lower hollow frame 27b and two more of the connecting plates 29 (discussed later).

The first travelling wheel unit 21a and the second travelling wheel unit 21b are attached to the travelling vehicle main body 19 at positions spaced apart in the X direction.

Figure 4:
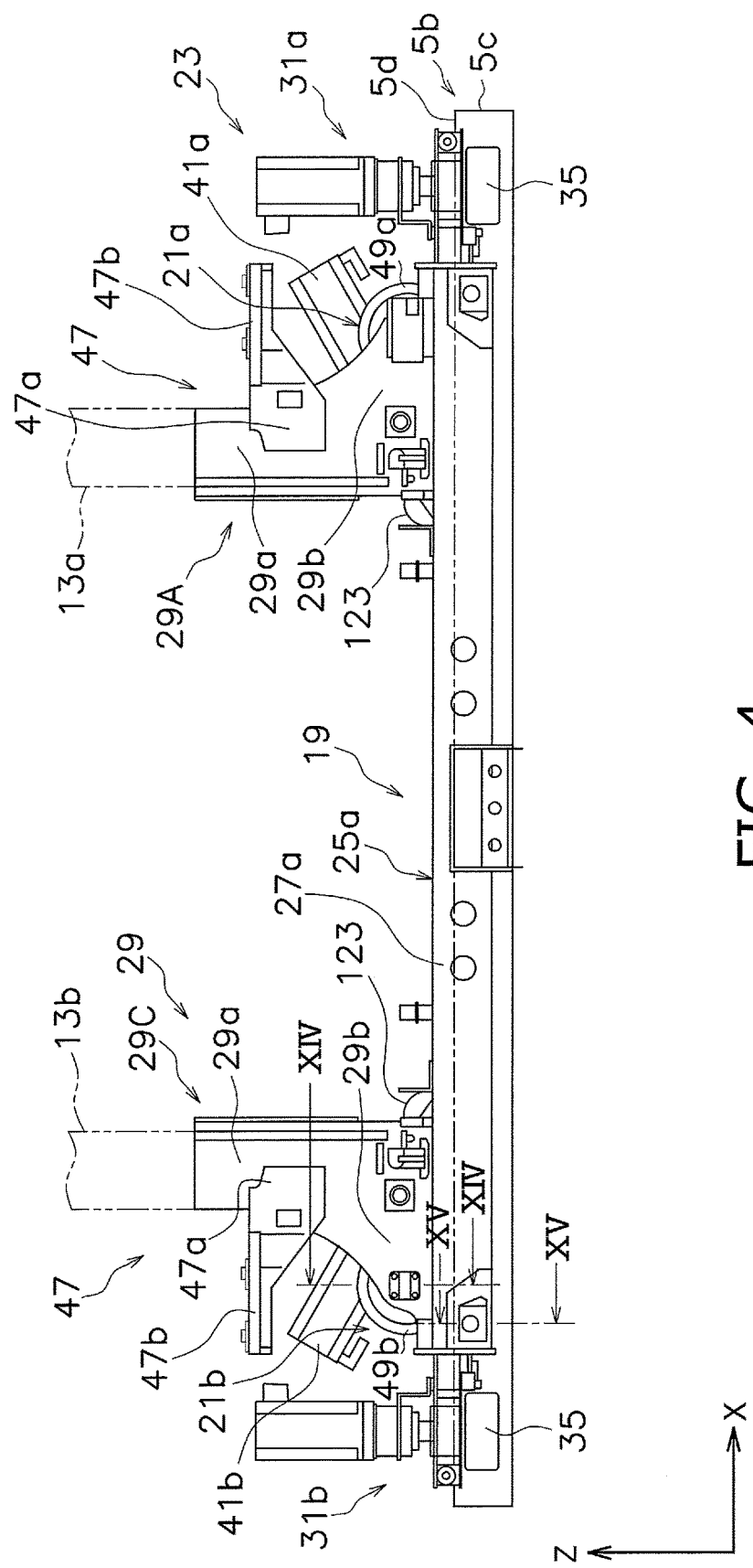
FIG. 4 is a front view of a travelling truck.
Figure 5:
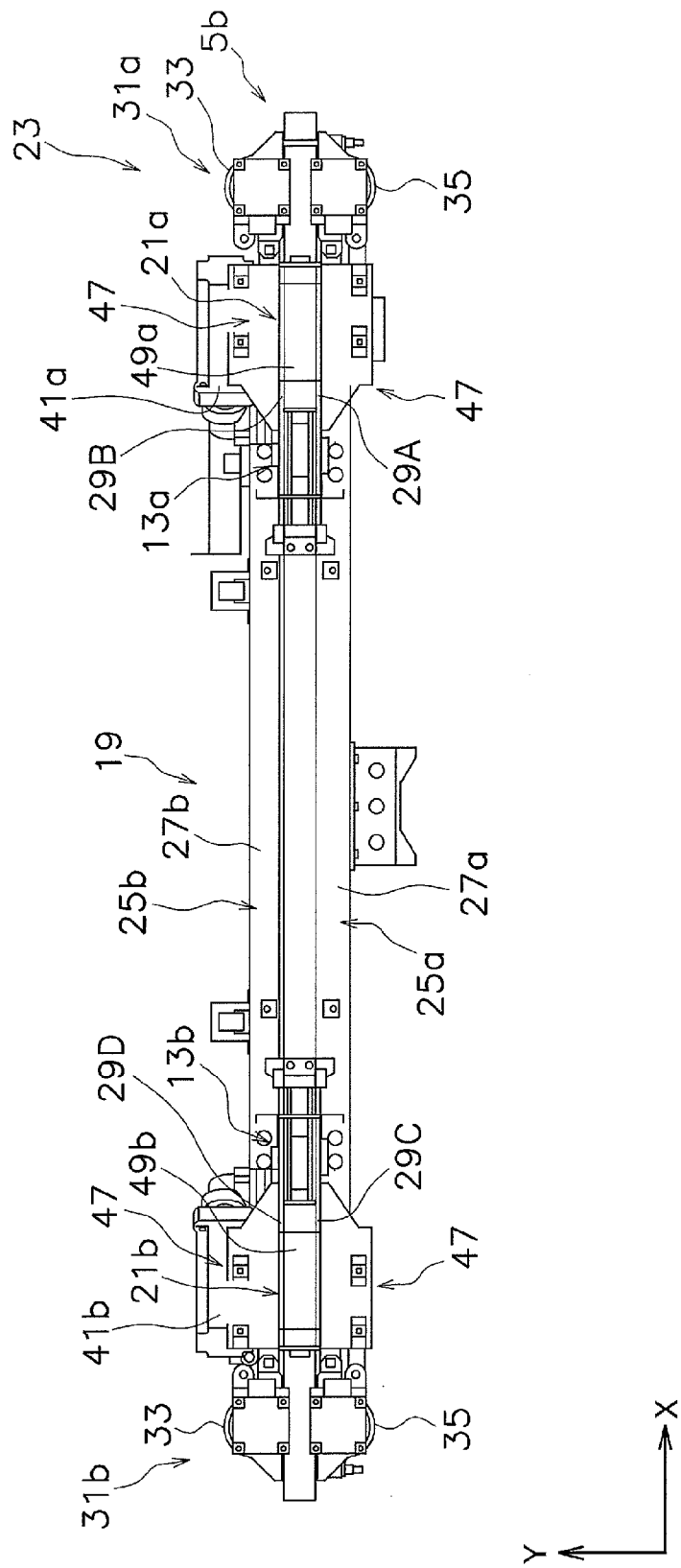
FIG. 5 is a plan view of the travelling truck.

The travelling drive mechanism 23 is configured to generate motive power to drive the travelling vehicle main body 19. As shown in FIG. 1, FIG. 4, and FIG. 5, the travelling drive mechanism 23 preferably includes a first drive wheel unit 31a and a second drive wheel unit 31b. The first drive wheel unit 31a and the second drive wheel unit 31b are attached to the travelling vehicle main body 19 spaced apart in the X direction. More specifically, the first drive wheel unit 31a and the second drive wheel unit 31b are attached to both ends of the travelling vehicle main body 19 in the X direction. The first drive wheel unit 31a and the second drive wheel unit 31b each include a first drive wheel 33 and a second drive wheel 35. In this case, the first drive wheel 33 and the second drive wheel 35 of the first drive wheel unit 31a may be called a first driving wheel and a second driving wheel, and the first drive wheel 33 and the second drive wheel 35 of the second drive wheel unit 31b may be called a third driving wheel and a fourth driving wheel.

The arrangement of each of the above mechanisms makes it possible to dispose the drive wheels using spaces in the X direction of the travelling vehicle main body 19. Furthermore, increasing the number of the drive wheels makes it possible to reduce the size of each of the drive wheels. As a result, maintenance of the drive wheels becomes easy.

As shown in FIG. 3, FIG. 4, and FIG. 5, the first travelling wheel unit 21*a* and the second travelling wheel unit 21*b* are respectively located outward of the first mast 13*a* and the second mast 13*b* in the X direction. Here, "outward in the X direction" means "on the sides spaced apart from one another in the X direction." Accordingly, specifically, the first travelling wheel unit 21*a* is disposed on the side opposite the second mast 13*b* with respect to the first mast 13*a*, and the second travelling wheel unit 21*b* is disposed on the side opposite the first mast 13*a* with respect to the second mast 13*b*. Furthermore, the first travelling wheel unit 21*a* and the second travelling wheel unit 21*b* are disposed slightly spaced apart from the first mast 13*a* and the second mast 13*b*, but they may be adjacent.

In addition, the first drive wheel unit 31*a* and the second drive wheel unit 31*b* are respectively located outward of the first travelling wheel unit 21*a* and the second travelling wheel unit 21*b* in the X direction. Here, "outward in the X direction" means "on the sides spaced apart from one another in the X direction." Accordingly, specifically, the first drive wheel unit 31*a* is disposed on the side opposite the second travelling wheel unit 21*b* with respect to the first travelling wheel unit 21*a*, and the second drive wheel unit 31*b* is disposed on the side opposite the first travelling wheel unit 21*a* with respect to the second travelling wheel unit 21*b*. Furthermore, the first drive wheel unit 31*a* and the second drive wheel unit 31*b* are slightly spaced apart from the first travelling wheel unit 21*a* and the second travelling wheel unit 21*b*, but they may be adjacent.

In the above case, the load imparted by the first mast 13*a* and the second mast 13*b* is supported by the travelling vehicle main body 19, the first travelling wheel unit 21*a*, and the second travelling wheel unit 21*b*, and therefore the first drive wheel unit 31*a* and the second drive wheel unit 31*b* tend not to be affected by wheel pressure fluctuations.

As shown in FIG. 1, the upper portions of the first mast 13*a* and the second mast 13*b* are linked together by a linking member 55 that extends in the X direction. In addition, as shown in FIG. 1, the first mast 13*a* and the second mast 13*b* are each provided with a roller mechanism 57 that is guided by the upper guide rail 5*a*.

The stacker crane 1 includes a lifting drive mechanism 37 (one example of a lifting apparatus) configured to raise and lower, and thus drive, the lift platform 15. The lifting drive mechanism 37 includes hanging belts 39, a first lifting drive motor 41*a*, and a second lifting drive motor 41*b*. The lift platform 15 is capable of moving in the Z direction along the first mast 13*a* and the second mast 13*b*. Specifically, the lift platform 15 is disposed between the first mast 13*a* and the second mast 13*b* in the X direction and is configured to be raised and lowered along the first mast 13*a* and the second mast 13*b* (discussed later). Furthermore, portions on both sides of the lift platform 15 are supported by the first mast 13*a* and the second mast 13*b*, respectively, so as to be liftable. The hanging belts 39 are attached to the lift platform 15. The first lifting drive motor 41*a* and the second lifting drive motor 41*b* are motors that drive the hanging belts 39 and are mounted to the first lower frame 25*a* and the second lower frame 25*b* in a tilted state. Specifically, upper ends of the first lifting drive motor 41*a* and the second lifting drive motor 41*b* are disposed on sides in the X direction with respect to lower ends of the first lifting drive motor 41*a* and the second lifting drive motor 41*b*.

The stacker crane 1 further includes a first controller 45*a*, a second controller 45*b*, and four support members 47. The first controller 45*a* and the second controller 45*b* are configured or programmed to control various operations of the stacker crane 1. The first controller 45*a* is supported by and fixed to the two support members 47 disposed on one side in the X direction. The second controller 45*b* is supported by and fixed to the two support members 47 disposed on the opposite side in the X direction. The support members 47 are fixed to the first lower frame 25*a* and the second lower frame 25*b*. The interior of the first controller 45*a* and the second controller 45*b* include electrical equipment, such as inverters, converters, and breakers, first travelling drive motors 81, second travelling drive motors 83, the first lifting drive motor 41*a*, and the second lifting drive motor 41*b*.

A transfer apparatus 17 is provided on the lift platform 15. The transfer apparatus 17 is configured to transfer articles between the stacker crane 1 and the shelves of the racks. The transfer apparatus 17 is capable of placing articles thereupon. Furthermore, the transfer apparatus 17 is configured to transfer articles from the stacker crane 1 to the shelves of the racks and to transfer articles from the shelves of the racks to the lift platform 15 of the stacker crane 1. The transfer apparatus 17 preferably includes a push-pull system that includes a telescoping arm. However, a slide fork system or some other system may be used as the transfer apparatus.

In the present preferred embodiment, the connecting plates 29 preferably are thin plate-shaped members. Furthermore, because other mechanisms are disposed between the pair of connecting plates 29 (between the pair of connecting plates 29 in the Y direction), the dimension of the travelling vehicle main body 19 in the Y direction is reduced, as shown in FIG. 5. For example, travelling wheels 49, the first mast 13*a*, the second mast 13*b*, and the lifting drive mechanism 37 are disposed between the pair of connecting plates 29.

The structure of the travelling vehicle main body 19 will be explained in greater detail.

Figure 8:
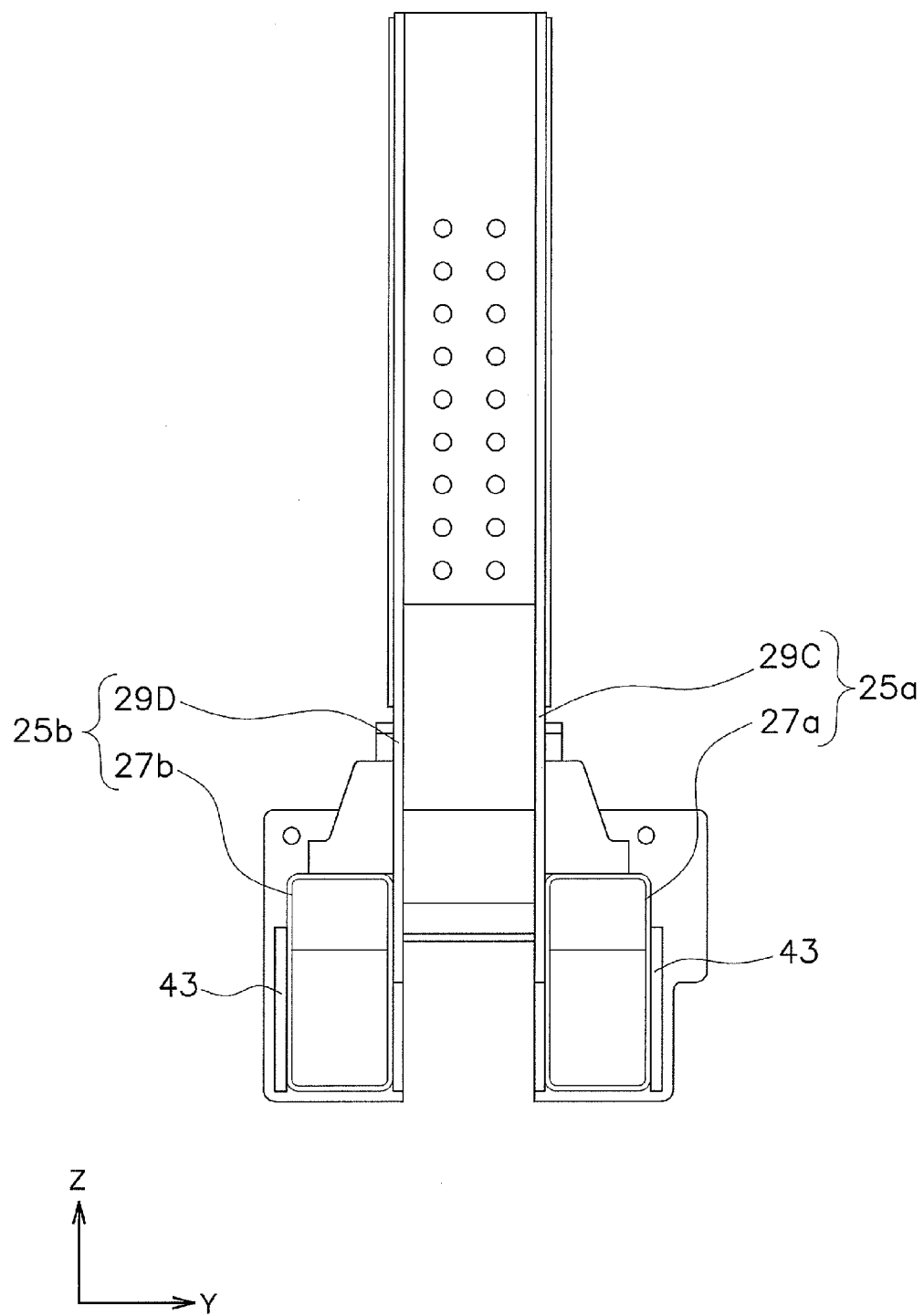
FIG. 8 is a side view of the lower frame.
Figure 14:
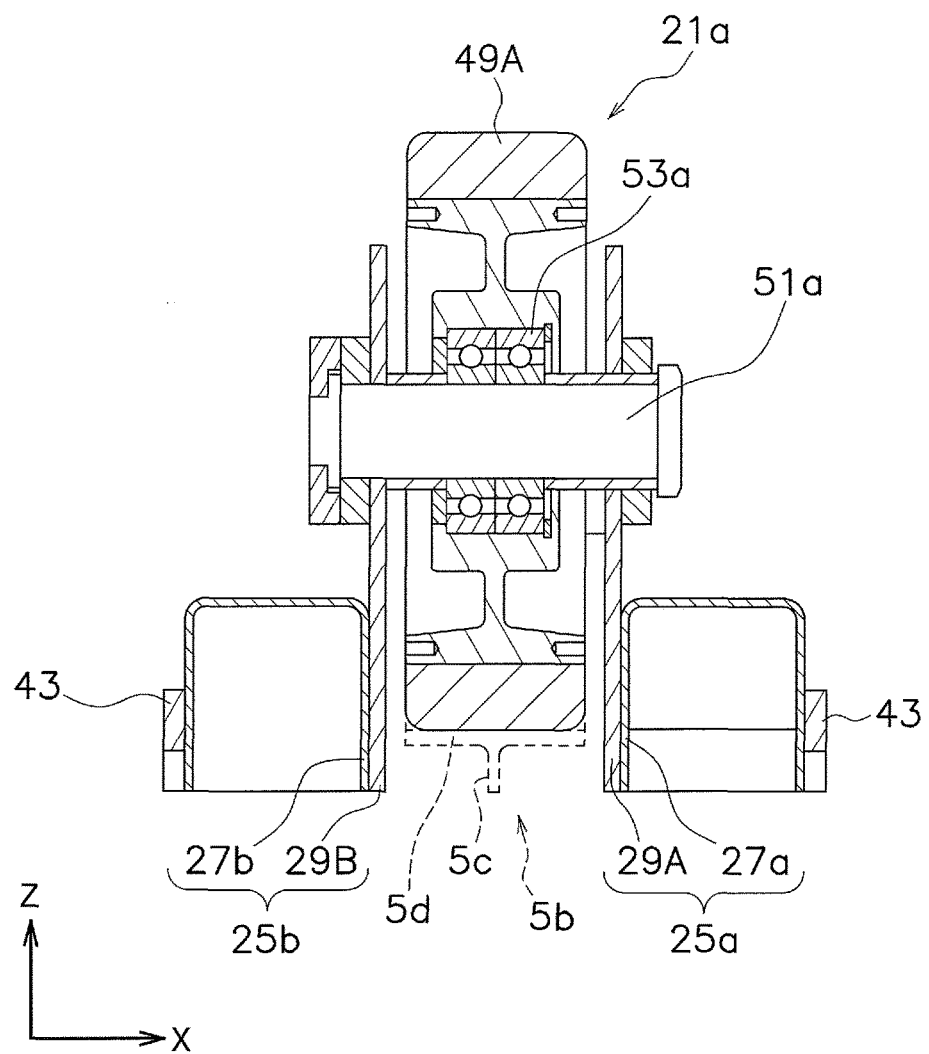
FIG. 14 is a cross sectional view taken along the line XIV-XIV in FIG. 4.

As shown in FIG. 8 and FIG. 14, the first lower hollow frame 27*a* and the second lower hollow frame 27*b* preferably include square pipes having rectangular cross sections, and the longitudinal direction thereof coincides with the X direction. As is clear from the drawings, the first lower hollow frame 27*a* and the second lower hollow frame 27*b* are longer in the Z direction than in the Y direction and include oblong cross sections. The first lower hollow frame 27*a* and the second lower hollow frame 27*b* are disposed on opposite sides of the lower guide rail 5*b* in the Y direction. More specifically, the first lower hollow frame 27*a* and the second lower hollow frame 27*b* are disposed sideward of the lower guide rail 5*b* (at positions that overlap when viewed in the Y direction). As a result, upper surface portions of the first lower hollow frame 27*a* and the second lower hollow frame 27*b* are disposed at positions that are higher than the horizontal portion 5*d* of the lower guide rail 5*b*. Furthermore, the first lower hollow frame 27*a* and the second lower hollow frame 27*b* are joined to one another via another member or mechanism.

The first lower hollow frame 27*a* and the second lower hollow frame 27*b* are disposed on both sides of the first mast 13*a* and the second mast 13*b* in the Y direction and are fixed to the first mast 13*a* and the second mast 13*b* via the connecting plates 29 (discussed later).

Figure 6:
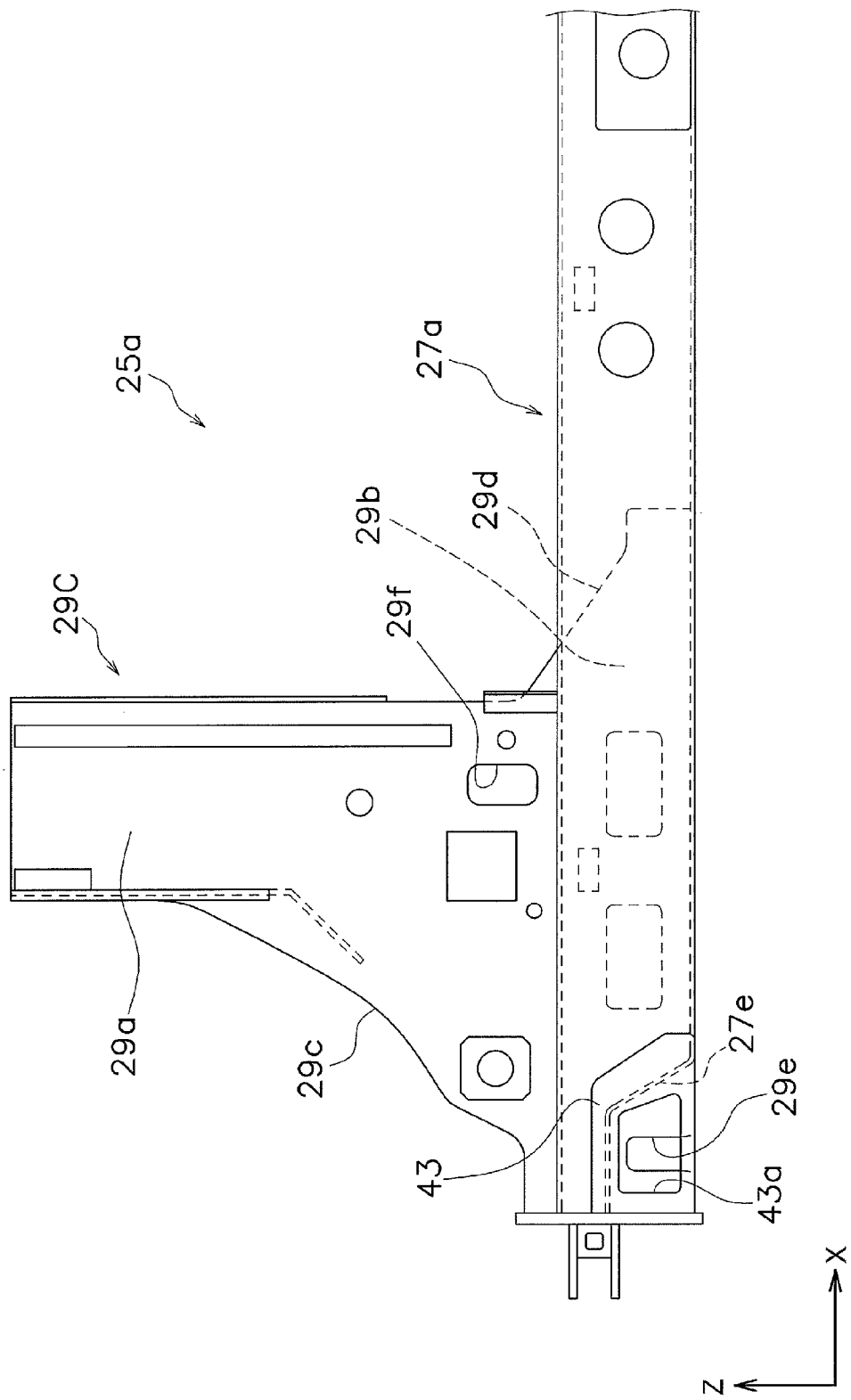
FIG. 6 is a partial front view of a lower frame.

Furthermore, as shown in FIG. 6, notches 27*e* are provided in lower portions of the first lower hollow frame 27*a* and the second lower hollow frame 27*b* at both ends in the X direction. Reinforcing plates 43 are fixed to side surfaces of the notches 27*e* in the Y direction. Openings 43*a* are provided in the reinforcing plates 43 at positions corresponding to the notches 27*e*.

Figure 7:
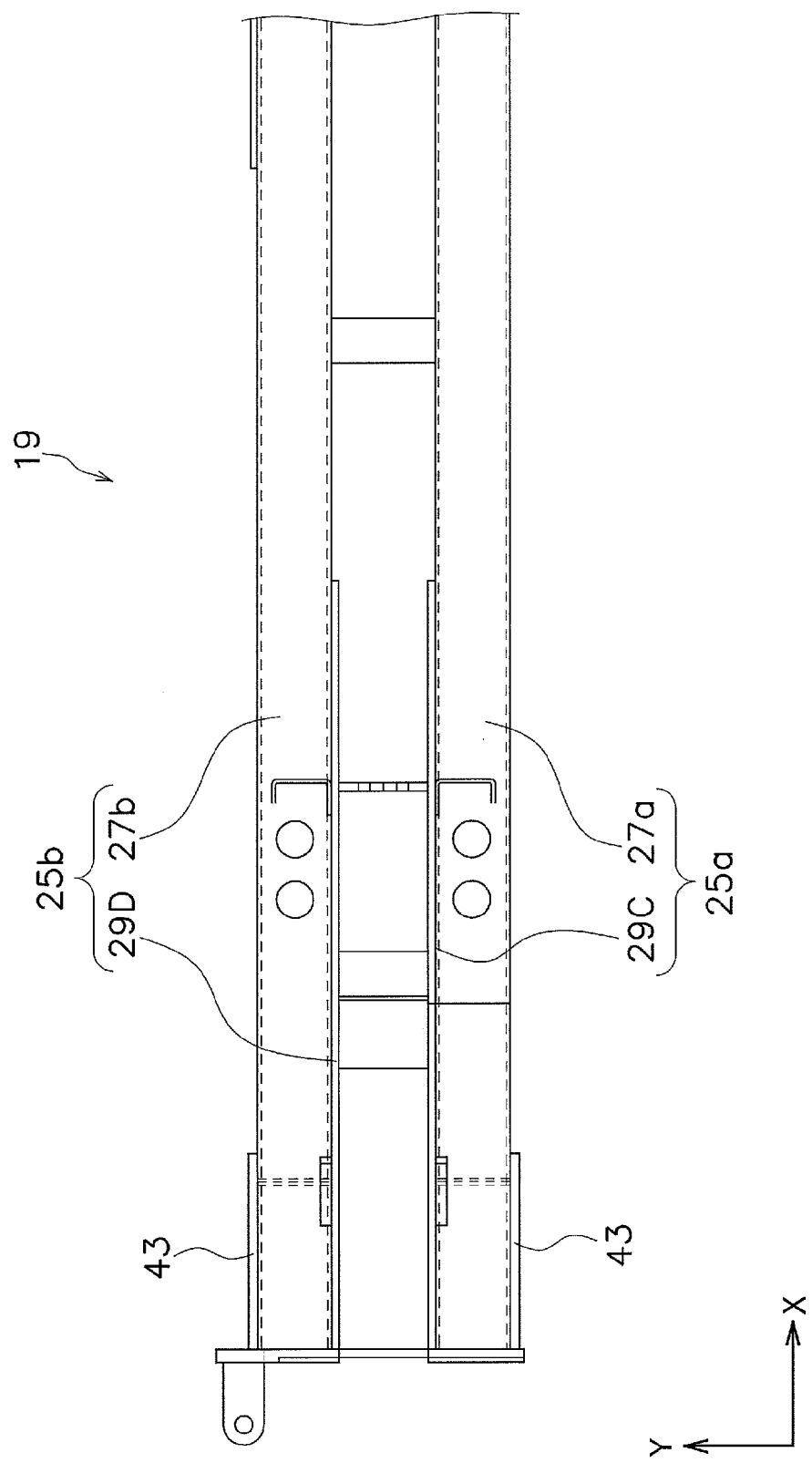
FIG. 7 is a partial plan view of the lower frame.

As shown in FIG. 7 and FIG. 8, the connecting plates 29 preferably are four thin plate-shaped members that are mounted to the lower portions and to both side surfaces facing the Y direction of the first mast 13*a* and the second mast 13*b*. The flat surfaces of the connecting plates 29 face the Y direction. As shown in FIG. 5, those mounted to the first mast 13*a* are a first plate 29A and a second plate 29B, and those mounted to the second mast 13*b* are a third plate 29C and a fourth plate 29D. The connecting plates 29 are fixed, by welding, to inner side surfaces of the first lower hollow frame 27*a* and the second lower hollow frame 27*b* in the Y direction. In other words, the first lower frame 25*a* includes the first lower hollow frame 27*a* and the two connecting plates 29 (the first plate 29A and the third plate 29C) that are fixed, by welding, to the inner sides thereof in the Y direction and at both ends thereof in the X direction. In addition, the second lower frame 25*b* includes the second lower hollow frame 27*b* and the two connecting plates 29 (the second plate 29B and the fourth plate 29D) that are fixed, by welding, to the inner sides thereof in the Y direction and at both ends thereof in the X direction.

To explain in further detail, the first mast 13*a* is fixed to inner side surfaces of the first plate 29A and the second plate 29B in the Y direction, and the first lower hollow frame 27*a* and the second lower hollow frame 27*b* are fixed to outer side surfaces of the first plate 29A and the second plate 29B, respectively, in the Y direction. The second mast 13*b* is fixed to inner side surfaces of the third plate 29C and the fourth plate 29D in the Y direction, and the first lower hollow frame 27*a* and the second lower hollow frame 27*b* are fixed to outer side surfaces of the third plate 29C and the fourth plate 29D, respectively, in the Y direction.

As explained above, the first mast 13*a* is fixed to the first lower hollow frame 27*a* and the second lower hollow frame 27*b* via the connecting plates 29 (the first plate 29A and the second plate 29B, respectively). In addition, the second mast 13*b* is fixed to the first lower hollow frame 27*a* and the second lower hollow frame 27*b* via the connecting plates 29 (the third plate 29C and the fourth plate 29D, respectively). In this case, because the thickness of the connecting plates 29 in the Y direction is small, the first mast 13*a* and the second mast 13*b* as well as the first lower hollow frame 27*a* and the second lower hollow frame 27*b* are proximate in the Y direction. Thereby, as shown in FIG. 5, FIG. 7, and FIG. 8, the entire structure is compact in the Y direction.

Figure 9:
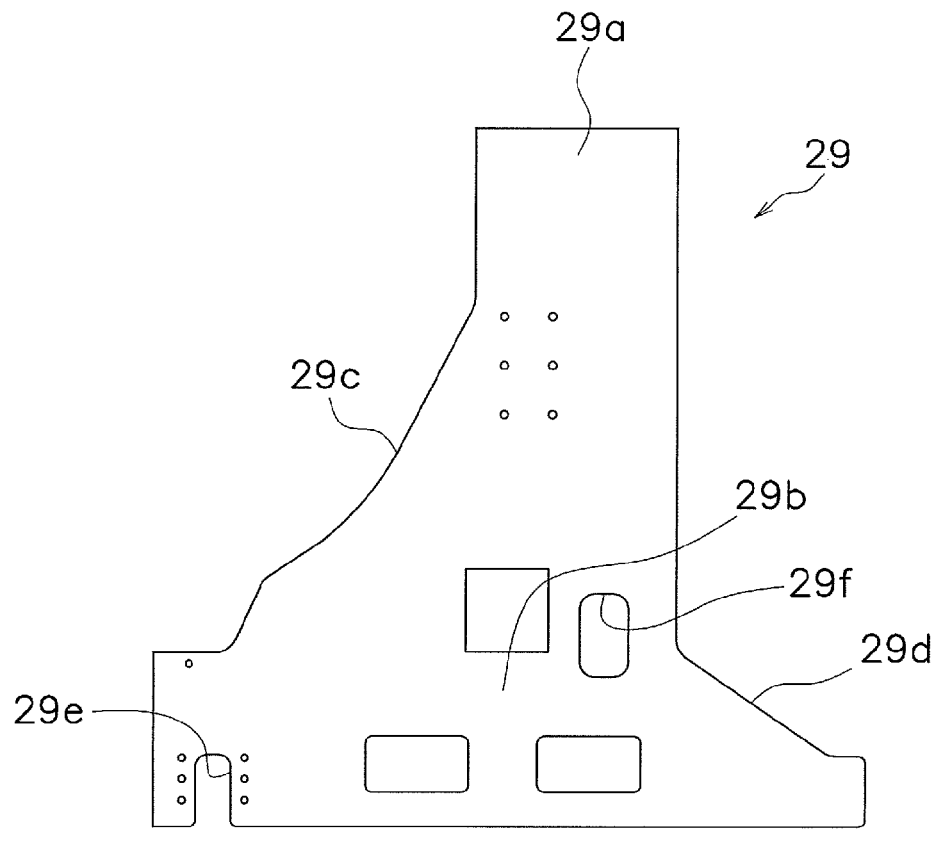
FIG. 9 is a front view of a connecting plate.

As shown in FIG. 9, the connecting plate 29 preferably includes an upper portion 29*a* and a lower portion 29*b*. The upper portion 29*a* extends long in the Z direction, and the lower portion 29*b* extends long in the X direction. Accordingly, the width of the lower portion 29*b* (the X directional length) is greater than the width of the upper portion 29*a*. In addition, the connecting plate 29 includes a first tilted surface 29*c* that extends diagonally on the outer side in the X direction and a second tilted surface 29*d* that extends diagonally on the inner side in the X direction. The second tilted surface 29*d* is provided at a position that is lower than that of the first tilted surface 29*c*. In the connecting plate 29, a notch 29*e*, which extends in the Z direction and is open on the lower side, is further provided in a lower surface of an outer side portion in the X direction.

As described above, the first tilted surface 29*c* and the second tilted surface 29*d* are provided on the connecting plate 29. These structures are configured to block any shaking (tilting in the X direction) of the first mast 13*a* and the second mast 13*b*. In the present preferred embodiment, providing the first tilted surface 29*c* at a comparatively high position is effective in blocking movement that would cause the first mast 13*a* or the second mast 13*b* to topple toward the outer side in the X direction.

The first lower hollow frame 27*a* and the second lower hollow frame 27*b* are fixed to the lower portion 29*b* of the connecting plate 29. In greater detail, a first end of the first lower hollow frame 27*a* is fixed to an outer side surface in the Y direction of the lower portion 29*b* of the first plate 29A, and a second end of the first lower hollow frame 27*a* is fixed to an outer side surface in the Y direction of the lower portion 29*b* of the third plate 29C. In addition, a first end of the second lower hollow frame 27*b* is fixed to an outer side surface in the Y direction of the lower portion 29*b* of the second plate 29B, and a second end of the second lower hollow frame 27*b* is fixed to an outer side surface in the Y direction of the lower portion 29*b* of the fourth plate 29D.

Furthermore, lower ends of the first mast 13*a* and the second mast 13*b* are fixed to the upper portions 29*a* of the connecting plates 29. In greater detail, the lower end of the first mast 13*a* is fixed to an inner side surface in the Y direction of the upper portion 29*a* of the first plate 29A and to an inner side surface in the Y direction of the upper portion 29*a* of the second plate 29B. In addition, the lower end of the second mast 13*b* is fixed to an inner side surface in the Y direction of the upper portion 29*a* of the third plate 29C and to an inner side surface in the Y direction of the upper portion 29*a* of the fourth plate 29D.

As described above, the first mast 13*a* and the second mast 13*b* are fixed to the first lower hollow frame 27*a* and the second lower hollow frame 27*b* via the connecting plates 29. In addition, based on the above configuration, the connecting plates 29 define and function as ribs that support the first mast 13*a* and the second mast 13*b*. Accordingly, the stresses that act on the first mast 13*a* and the second mast 13*b* are reduced. As a result, higher performance of the stacker crane 1 is achieved.

The first travelling wheel unit 21*a* and the second travelling wheel unit 21*b* will be explained in further detail.

The first travelling wheel unit 21*a* and the second travelling wheel unit 21*b* are mounted to the lower portions 29*b* of the connecting plates 29. As shown in FIG. 3, FIG. 5, and FIG. 14, the first travelling wheel unit 21*a* and the second travelling wheel unit 21*b* each include the travelling wheel 49. The travelling wheels 49 define and function as follower wheels and are configured such that they roll on a top surface of the lower guide rail 5*b* (a top surface of the horizontal portion 5*d*). Accordingly, the stresses that act on the connecting plates 29 are reduced.

Specifically, as shown in FIG. 14, the first travelling wheel unit 21*a* includes a first travelling wheel 49*a*, a first shaft member 51*a*, and a first bearing 53*a*. The first travelling wheel 49*a* is fixed to both ends of the first shaft member 51*a* via the first bearing 53*a*. As shown in FIG. 14, the first shaft member 51*a* extends in the Y direction and both ends thereof are fixed to a pair of the connecting plates 29 (the pair of connecting plates 29 fixed to the first lower hollow frame 27*a* and the second lower hollow frame 27*b* on one side in the X direction, that is, the first plate 29A and the second plate 29B).

The second travelling wheel unit 21*b* preferably has the same structure as that of the first travelling wheel unit 21*a* and, although not illustrated, has a second travelling wheel 49*b*, a second shaft member (not shown), and a second bearing (not shown). The second travelling wheel 49*b* is fixed to both ends of the second shaft member via the second bearing. The second shaft member extends in the Y direction, and both ends thereof are fixed to a pair of the connecting plates 29 (the pair of connecting plates 29 fixed to the first lower hollow frame 27a and the second lower hollow frame 27b on the opposite side in the X direction, that is, the third plate 29C and the fourth plate 29D).

As discussed above, both shaft ends of the first travelling wheel 49a are rotatably supported by the first plate 29A and the second plate 29B. Both shaft ends of the second travelling wheel 49b are rotatably supported by the third plate 29C and the fourth plate 29D. Thus, the connecting plates 29 are configured to support the travelling wheels 49, which reduces the portion count.

Figure 15:
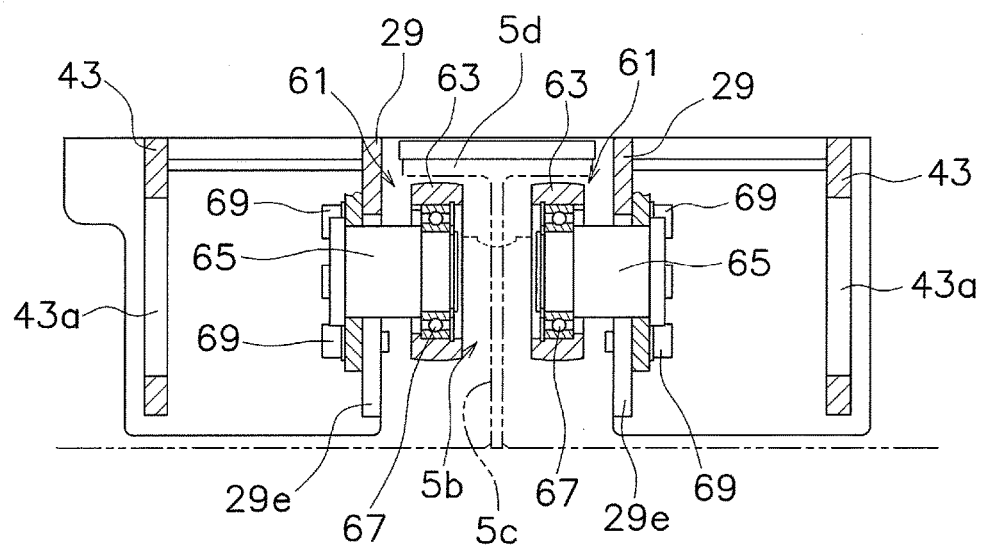
FIG. 15 is a cross sectional view taken along the line XV-XV in FIG. 4.

Furthermore, as shown in FIG. 15, floating prevention roller units 61 are mounted to the lower portions 29b (more specifically, the notches 29e) of the connecting plates 29. Accordingly, the attachment of the floating prevention roller units 61 to the connecting plates 29 and the detachment of the floating prevention roller units 61 from the connecting plates 29 are easy. Thus, the inspection and replacement of the floating prevention roller units 61 become easy.

More specifically, as shown in FIG. 15, the floating prevention roller units 61 are disposed on the inner sides of the connecting plates 29 in the Y direction and are mounted to the notches 29e. Each floating prevention roller unit 61 includes a roller 63, a shaft member 65, and a bearing 67. Each roller 63 is disposed proximate to and downward of the horizontal portion 5d of the lower guide rail 5b. Each roller 63 is rotatably supported by one end of its corresponding shaft member 65 via its corresponding bearing 67. Each shaft member 65 is mounted to its corresponding notch 29e and, furthermore, another end is fixed to its corresponding connecting plate 29. Furthermore, bolts 69 that fix the shaft members 65 to the connecting plates 29 are able to be operated through the openings 43a of the reinforcing plates 43 and the notches 27e of the first lower hollow frame 27a and the second lower hollow frame 27b. Accordingly, the mounting and dismounting of the floating prevention roller unit 61 become easy.

Furthermore, the floating prevention roller units 61 should be moved to the upper side in the Z direction when being mounted to the notches 29e and should be moved to the lower side in the Z direction when being dismounted from the notches 29e.

Furthermore, because the rotatable rollers 63 are used as a floating prevention mechanism, even if the travelling vehicle main body 19 were to float up while travelling (particularly during acceleration and deceleration), the load between the lower guide rail 5b and the floating prevention mechanism is reduced. As a result, the burden on both the lower guide rail 5b and the travelling vehicle main body 19 is lessened.

The configuration positions of the first controller 45a and the second controller 45b will be explained in further detail.

The support members 47 are four members, and one support member 47 is fixed to each of the connecting plates 29. Each support member 47 includes a fixed portion 47a and a support portion 47b. One of the fixed portions 47a is fixed to the outer side surface in the Y direction of each of the connecting plates 29. The fixing positions of the fixed portions 47a are the upper portions 29a of the connecting plates 29. The support portion 47b extends from the outer side of the fixed portion 47a in the X direction. In so doing, as shown in FIG. 3, the first controller 45a is disposed on the two support portions 47b that are on one side end in the X direction and adjacent in the Y direction, and the second controller 45b is disposed on the two support portions 47b that are on the opposite side end in the X direction and adjacent in the Y direction.

As discussed above, space saving is achieved because the connecting plates 29 are what fix the first controller 45a and the second controller 45b via the support members 47. In particular, as shown in FIG. 3 and FIG. 4, the support portions 47b of the support members 47 are disposed proximate to the upper ends of the first lifting drive motor 41a and the second lifting drive motor 41b. Accordingly, the installation positions of the first controller 45a and the second controller 45b are capable of being lowered. In particular, as discussed later, because the first lifting drive motor 41a and the second lifting drive motor 41b are tilted and their heights are low, the installation positions of the first controller 45a and the second controller 45b are capable of being lowered.

The travelling drive mechanism 23 will be further explained.

Figure 11:
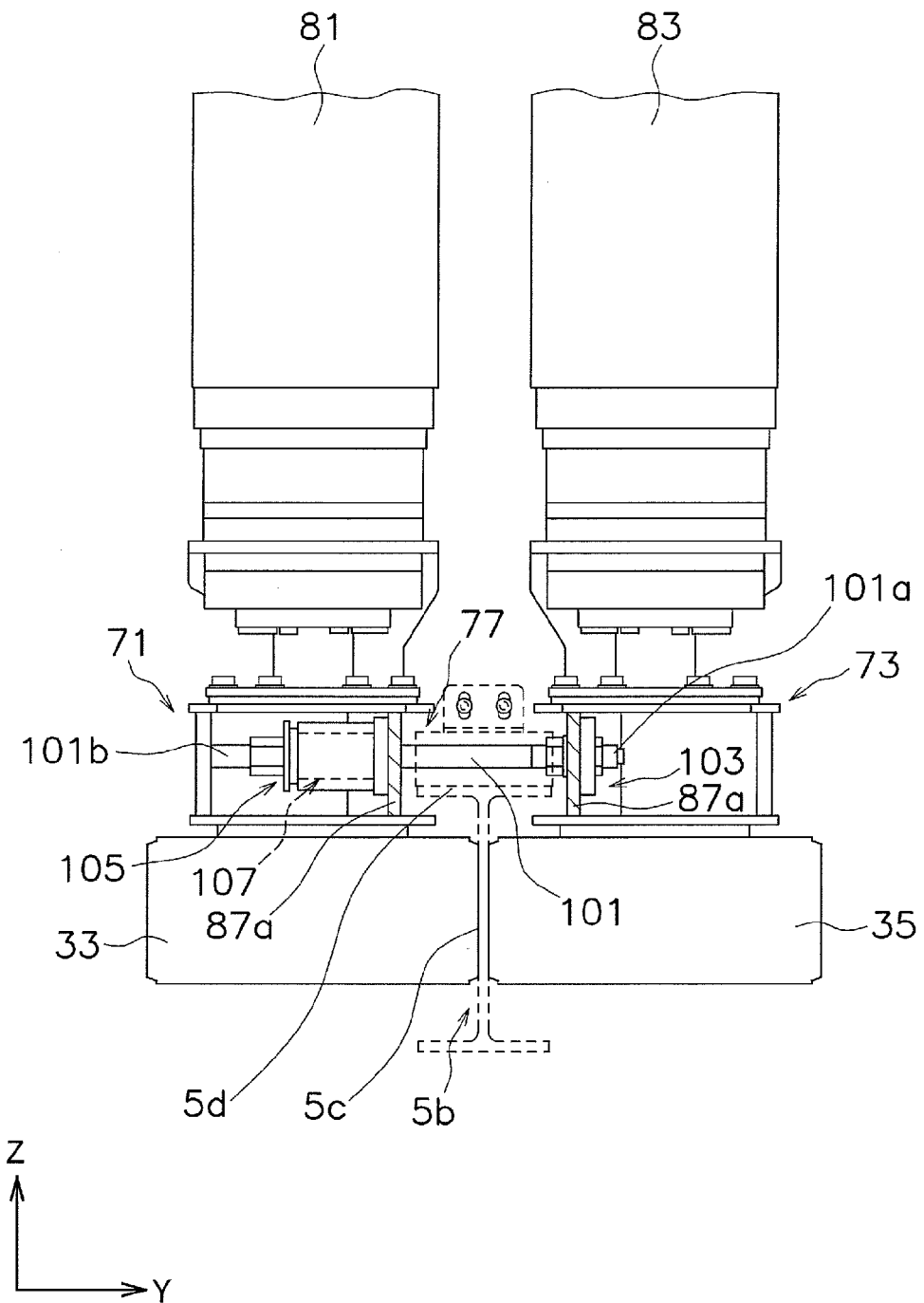
FIG. 11 is a front view of the drive wheel unit.
Figure 12:
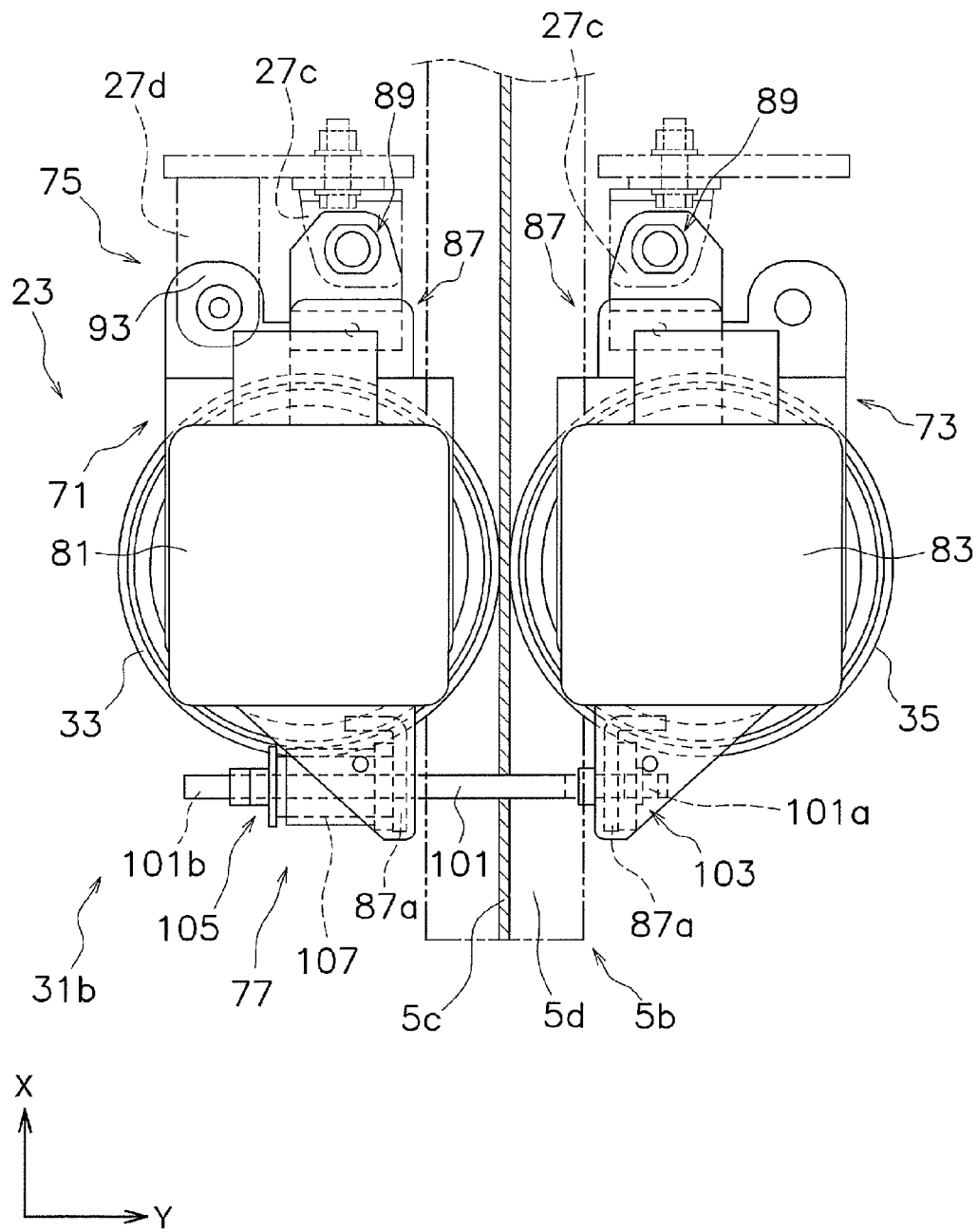
FIG. 12 is a plan view of the drive wheel unit.

The first drive wheel unit 31a and the second drive wheel unit 31b are mounted to the first lower hollow frame 27a and the second lower hollow frame 27b. The first drive wheel unit 31a and the second drive wheel unit 31b are each supported by both end portions in the X direction of the first lower hollow frame 27a and the second lower hollow frame 27b and include the first drive wheel 33 and the second drive wheel 35. Thus, a set of the first drive wheel 33 and the second drive wheel 35 preferably is disposed at each end on both sides of the travelling vehicle main body 19 in the X direction; that is, the stacker crane 1 preferably includes a total of four of the drive wheels. As shown in FIG. 4, FIG. 11, and FIG. 12, the first drive wheels 33 and the second drive wheels 35 are capable of making contact with side surfaces of the lower guide rail 5b (side surfaces of the erect portion 5c).

Figure 10:
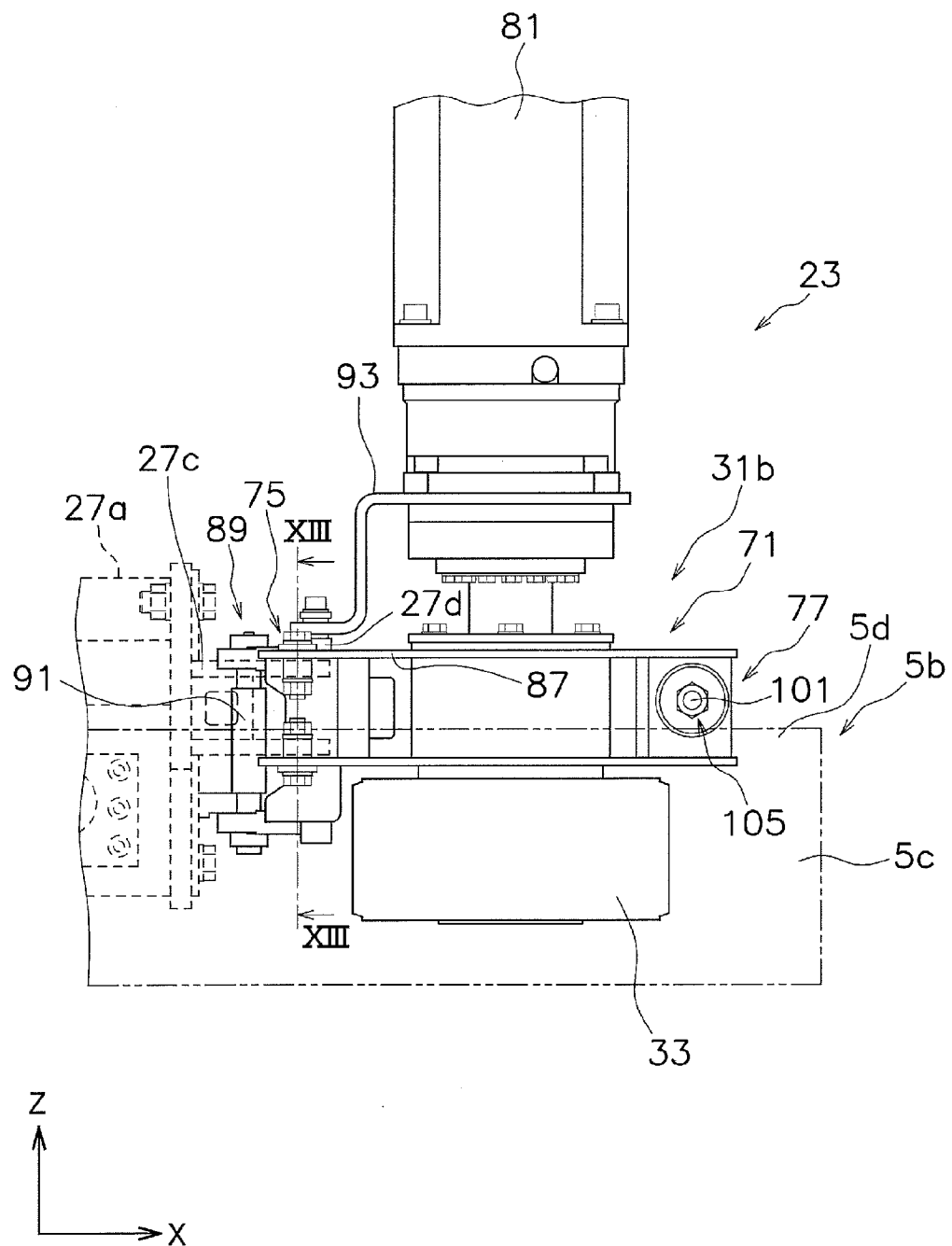
FIG. 10 is a side view of a drive wheel unit.
Figure 13:
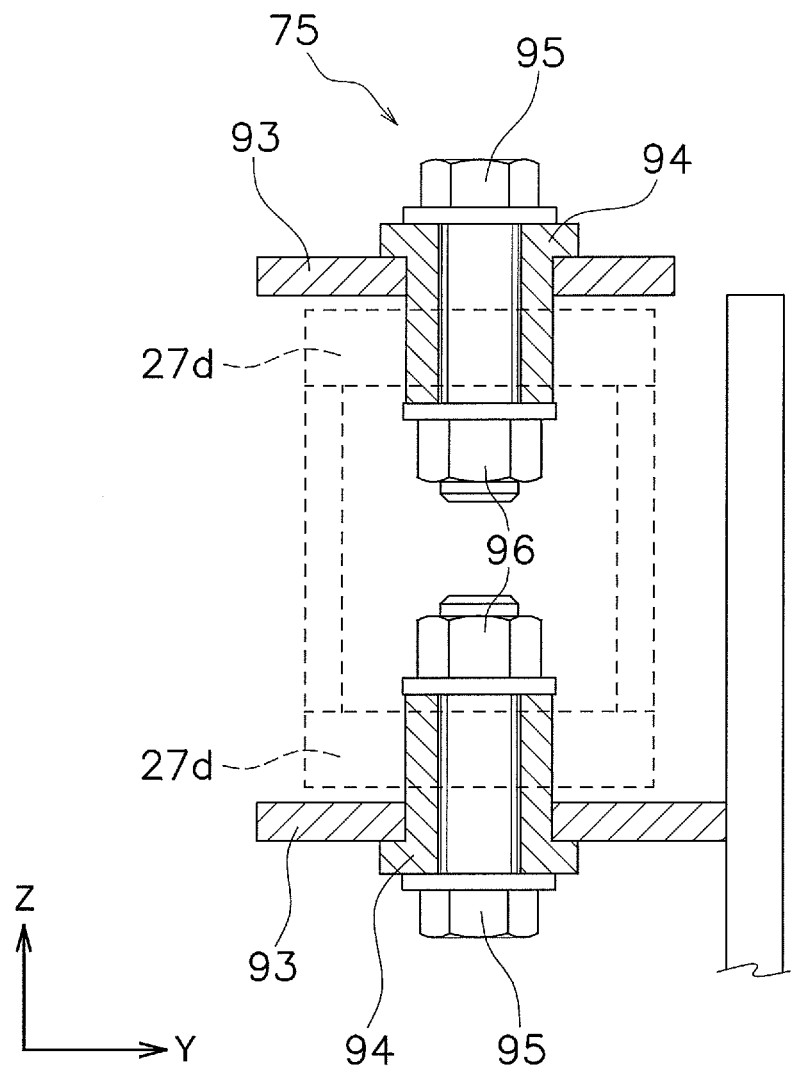
FIG. 13 is a cross sectional view taken along the line XIII-XIII in FIG. 10.

As shown in FIG. 11 and FIG. 12, the first drive wheel unit 31a and the second drive wheel unit 31b preferably each include a first wheel supporting portion 71 and a second wheel supporting portion 73. Thus, each set of the first wheel supporting portion 71 and the second wheel supporting portion 73 preferably is disposed at each end on both sides of the travelling vehicle main body 19 in the X direction; that is, the stacker crane 1 preferably includes a total of four of the wheel supporting portions. The first wheel supporting portions 71 are horizontally pivotably fixed to the first lower hollow frame 27a and the second lower hollow frame 27b of the travelling vehicle main body 19 (the details of which are discussed later). The first drive wheel 33 is supported by the first wheel supporting portion 71 and makes contact with one side surface of the lower guide rail 5b. As shown in FIG. 10, FIG. 12, and FIG. 13, a lock mechanism 75 non-pivotably fixes the first wheel supporting portion 71 to the first lower hollow frame 27a and the second lower hollow frame 27b of the travelling vehicle main body 19 (the details of which are discussed later).

The second wheel supporting portion 73 is horizontally pivotably fixed to the first lower hollow frame 27a and the second lower hollow frame 27b of the travelling vehicle main body 19 (the details of which are discussed later). The second drive wheel 35 is supported by the second wheel supporting portion 73 and makes contact with another side surface of the lower guide rail 5b. A pressing mechanism 77 (one example of a pressing mechanism) urges the first wheel supporting portion 71 and the second wheel supporting portion 73 in a direction that narrows the spacing between them, and that urging is released by the removal of the pressing mechanism 77. In addition, the above-described mechanism makes a guide roller unnecessary.

In the stacker crane 1, the first drive wheels 33 and the second drive wheels 35 clamp the side surfaces of the lower guide rail 5b by the urging of the pressing mechanisms 77. The travelling vehicle main body 19 travels in this state, and therefore variations in wheel pressure tends not to occur.

In addition, the impact of wheel pressure fluctuation is small, and therefore the pressing force that acts on the drive wheels is able to be set to a proper value that is not excessively large. As a result, the size of the drive wheels is reduced and the lifespan of the drive wheels is extended. Conventionally, if the left-right balance degrades due to wheel pressure fluctuations, the size of the drive wheels must be increased in order to handle a larger load.

In addition, the first wheel supporting portions 71 are non-pivotably fixed to the travelling vehicle main body 19 by way of the lock mechanisms 75. However, if the pressing mechanisms 77 are detached and, furthermore, the lock mechanisms 75 are released, then the first wheel supporting portions 71 and the second wheel supporting portions 73 both are able to pivot in direction away from one another. Thus, the first drive wheels 33 and the second drive wheels 35 become spaced apart from the lower guide rail 5b, and the maintenance (replacement, adjustment, and repair) of both drive wheels becomes easy.

The travelling drive mechanism 23 includes the first travelling drive motors 81 and the second travelling drive motors 83. By virtue of being fixed to the first wheel supporting portions 71, the first travelling drive motors 81 are horizontally pivotable with respect to both the first drive wheels 33 and the travelling vehicle main body 19. The first travelling drive motors 81 are capable of driving the first drive wheels 33. By virtue of being fixed to the second wheel supporting portions 73, the second travelling drive motors 83 are horizontally pivotable with respect to both the second drive wheels 35 and the travelling vehicle main body 19. The second travelling drive motors 83 are capable of driving the second drive wheels 35. Thus, a set of the first travelling drive motor 81 and the second travelling drive motor 83 preferably is disposed at each end on both sides of the travelling vehicle main body 19 in the X direction; that is, the stacker crane 1 preferably includes a total of four travelling drive motors. In this case, because the first travelling drive motors 81 and the second travelling drive motors 83 are able to horizontally pivot with respect to the first wheel supporting portions 71 and the second wheel supporting portions 73, respectively, the torque transmitting mechanism of the motor during maintenance is spaced apart from the lower guide rail and consequently does not interfere with maintenance.

The second drive wheel 35 of the first drive wheel unit 31a and the second drive wheel 35 of the second drive wheel unit 31b are disposed on the same side of the lower guide rail 5b in the Y direction. Accordingly, the stacker crane 1 travels stably and rectilinearly.

The structure wherein the first wheel supporting portions 71 and the second wheel supporting portions 73 pivot freely will be explained in detail.

As shown in FIG. 10 through FIG. 12, the first wheel supporting portion 71 and the second wheel supporting portion 73 each include a support member 87 and a pivoting support member 89. The support member 87 is a member including a plurality of plates extending in the X direction and, due to the pivoting support member 89, the inner side end in the X direction of the support member 87 pivots freely in the horizontal direction with respect to the first lower hollow frame 27a and the second lower hollow frame 27b. Namely, the pivoting centers of the first wheel supporting portion 71 and the second wheel supporting portion 73 are the pivoting support members 89. As shown in FIG. 11 and FIG. 12, the first drive wheel 33 and the first travelling drive motor 81 as well as the second drive wheel 35 and the second travelling drive motor 83 are fixed to the support members 87. Each pivoting support member 89 includes a pin 91 that extends in the Z direction. The pins 91 are attached to protruding plates 27c, which are provided on outer side end portions in the X direction of the first lower hollow frame 27a and the second lower hollow frame 27b, and furthermore pivotably support the support members 87 in the horizontal direction.

As discussed above, the position of the first drive wheel 33 and the second drive wheel 35 and the position of the pivoting support members 89 differ (they are spaced apart in the X direction as shown in FIG. 12) and therefore, when the first wheel supporting portion 71 or the second wheel supporting portion 73 pivots, the first drive wheel 33 or the second drive wheel 35 moves such that it defines an arcuate trajectory in a plan view. Furthermore, as shown in FIG. 12, the position at which the first drive wheel 33 contacts the lower guide rail 5b and the position at which the second drive wheel 35 contacts the lower guide rail 5b coincide in the X direction.

The structure and the function of the lock mechanism 75 will be explained in detail.

The lock mechanism 75 is configured to limit the pivoting of the first wheel supporting portion 71, the first drive wheel 33, and the first travelling drive motor 81 in the horizontal direction. As shown in FIG. 13, the lock mechanism 75 includes plates 93, collars 94, bolts 95, and nuts 96. The plates 93 are a pair of members extending from the lower portion of the first travelling drive motor 81. The plates 93 are disposed on the upward apparatus side and the downward apparatus side of a pair of protruding portions 27d provided at outer side end portions in the X direction of the first lower hollow frame 27a and the second lower hollow frame 27b. The collars 94 are disposed such that they pass through holes provided in the plates 93 and the protruding portions 27d. Main body portions of the bolts 95 pass through the interior of the collars 94, and the nuts 96 are screwed onto tips of the bolts 95. In this way, due to the bolts 95 and the nuts 96, the collars 94 cannot come off of the plates 93 and the protruding portions 27d. As a result, the plates 93, namely, the first wheel supporting portion 71, the first drive wheel 33, and the first travelling drive motor 81, cannot pivot in the horizontal direction due to the collars 94.

Furthermore, if the bolts 95 and the nuts 96 are operated and the collars 94 are removed, then the plates 93, namely, the first wheel supporting portion 71, the first drive wheel 33, and the first travelling drive motor 81, become pivotable in the horizontal direction.

The structure and the function of the pressing mechanism 77 will be explained in detail.

The pressing mechanism 77 includes a shaft 101 and an elastic member 107. As shown in FIG. 10, FIG. 11, and FIG. 12, the shaft 101 is disposed on outer sides of the pair of support members 87 in the X direction and extends in the Y direction. Both ends of the shaft 101 pass through protruding portions 87a, which are provided on outer sides of the support members 87 in the X direction. A first end 101a of the shaft 101 is fixed by a nut and a plate 103 to the protruding portion 87a of the support member 87 of the second wheel supporting portion 73. A second end 101b of the shaft 101 is elastically supported in the Y direction by the elastic member 107. Specifically, the elastic member 107 is disposed at the protruding portion 87a of the support member 87 of the first wheel supporting portion 71 on the side opposite the second wheel supporting portion 73 and is supported by a nut and a plate 105 that are fixed to the second end 101b of the shaft 101. The elastic member 107 is compressed in the Y direction between the protruding portion 87a on one side and the nut and the plate 105 on the other side. Accordingly, the elastic member 107 imparts an urging force to the first wheel supporting portion 71 and the second wheel supporting portion 73 such that they draw near in the Y direction. As a result, the first drive wheel 33 and the second drive wheel 35 make contact with, such that they clamp the side surfaces of the lower guide rail 5b (both surfaces of the erect portion 5c). Furthermore, the elastic member 107 preferably is a spring, for example, a compression coil spring.

Furthermore, the first wheel supporting portion 71 and the second wheel supporting portion 73 are able to be removed by, in the pressing mechanism 77, removing the nut and the plate 103 as well as the nut and the plate 105 from the shaft 101 and, furthermore, pulling the shaft 101 out of the protruding portion 87a.

Furthermore, the type of the pressing mechanism is not limited to the above-described preferred embodiment. In particular, the structure that attachably and detachably links to the wheel supporting portions is not limited to the combination of the shaft, the nuts, and the plates. In addition, the presence or absence, the type, and the arrangement position of the elastic member is not limited to the above-described preferred embodiment.

Figure 16:
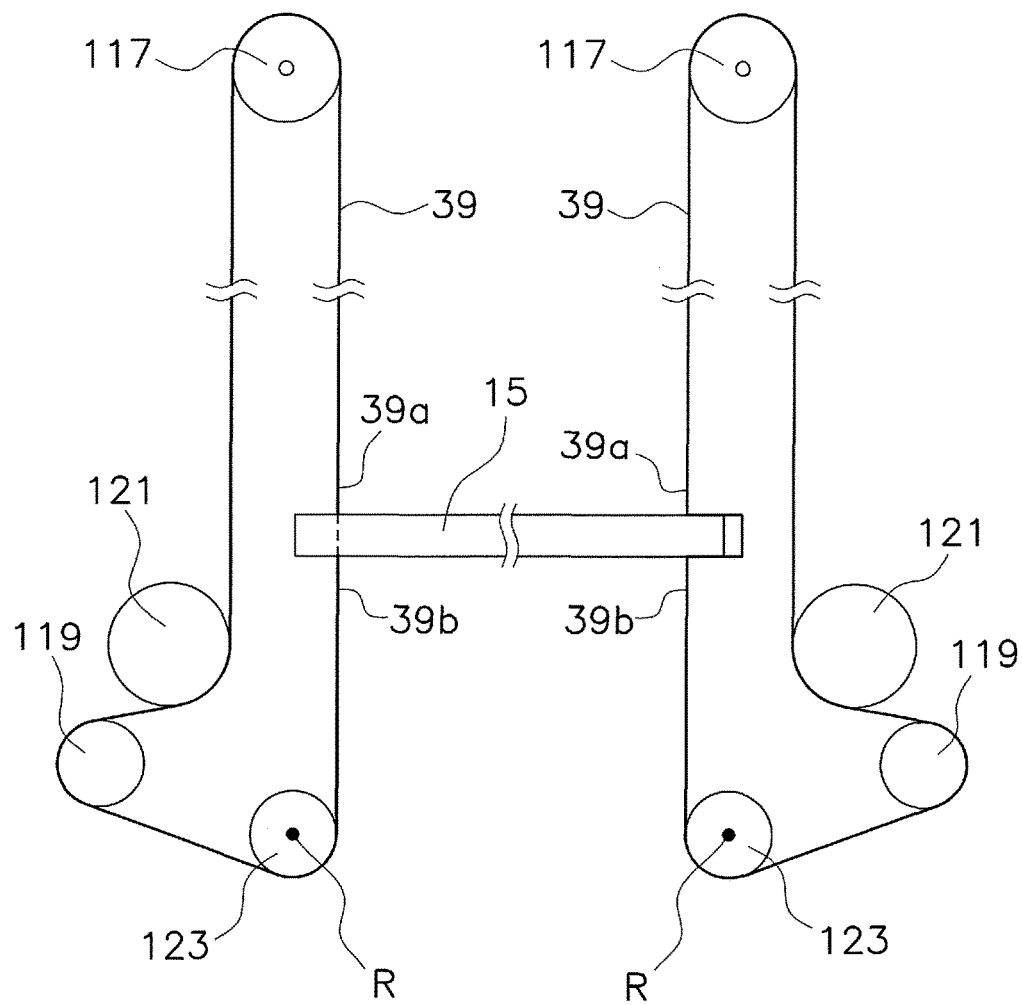
FIG. 16 is a schematic drawing of hanging belts and pulleys.

As schematically shown in FIG. 16, the lifting drive mechanism 37 includes the lift platform 15, the pair of hanging belts 39, a pair of upper pulleys 117, a pair of drive pulleys 119, a pair of idler pulleys 121, lower pulleys 123, the first lifting drive motor 41a, and the second lifting drive motor 41b.

The drive pulleys 119, the idler pulleys 121, and the lower pulleys 123 are rotationally supported by the pair of connecting plates 29. The direction in which the rotary shafts of these pulleys extend is the Y direction. More specifically, both shaft ends of the drive pulleys 119 and the idler pulleys 121 are directly supported by the pair of connecting plates 29, and both shaft ends of the lower pulleys 123 are supported by the pair of connecting plates 29 via supporting members 127 (discussed later) of tensioning mechanisms 125 (discussed later). That is, the drive pulleys 119, the idler pulleys 121, and the lower pulleys 123 are disposed between the pair of connecting plates 29 in the Y direction.

As is clear from the drawings, each member of the lifting drive mechanism 37 is provided symmetrically at both ends in the X direction, and therefore the configuration of only one side in the X direction will be explained below.

The hanging belt 39 is an endless drive belt that includes a first end 39a, which is fixed to an upper portion of the lift platform 15, and a second end 39b, which is fixed to a lower portion of the lift platform 15. The upper pulley 117 is disposed at the upper end—one upper pulley 117 per upper end—of the first mast 13a and the second mast 13b. The drive pulley 119 is configured to move the hanging belt 39 forward and in reverse by the driving force of the first lifting drive motor 41a or the second lifting drive motor 41b. The idler pulley 121 is disposed in the vicinity of the drive pulley 119 and, more specifically, is disposed upward of and on the inner side in the X direction of the drive pulley 119. The lower pulley 123 is disposed at the lower portion—one lower pulley 123 per lower portion—of the first mast 13a and the second mast 13b. The lower pulley 123 is disposed on the inner side of the drive pulley 119 in the X direction. The hanging belt 39 is looped around, in order starting from the first end 39a, the upper pulley 117, the idler pulley 121, the drive pulley 119, and the lower pulley 123, and ends at the second end 39b.

As shown in FIG. 4, the first lifting motor 41a and the second lifting drive motor 41b are fixed to outer side portions of the lower portions 29b of the connecting plates 29 in the X direction. Because the first lifting drive motor 41a and the second lifting drive motor 41b are fixed to the connecting plates 29 rather than to the first mast 13a and the second mast 13b, the stress that acts on the first mast 13a and the second mast 13b is reduced. In addition, because the attitude of the first lifting drive motor 41a and the second lifting drive motor 41b is in a tilted state, space saving in the Z direction is achieved more than it would be in an erect state. Furthermore, that the first lifting drive motor 41a and the second lifting drive motor 41b are tilted indicates the state wherein their main bodies are disposed such that their upper portions are positioned offset to the outer side in the X direction with respect to their lower portions. Accordingly, the size of the first lifting drive motor 41a and the second lifting drive motor 41b in the Y direction is not increased.

More specifically, the first lifting drive motor 41a is fixed to an outer side surface of the second plate 29B in the Y direction, and the second lifting drive motor 41b is fixed to an outer side surface of the fourth plate 29D in the Y direction. That is, the first lifting drive motor 41a and the second lifting drive motor 41b are disposed on the outer sides of the pair of connecting plates 29 in the Y direction; that is, the first lifting drive motor 41a and the second lifting drive motor 41b are disposed at positions offset to one side (the upper side in FIG. 5) in the Y direction from the center of the travelling vehicle main body 19 in the Y direction, and therefore the space between the pair of connecting plates 29 is effectively utilized. In particular, because the first lifting drive motor 41a and the second lifting drive motor 41b are disposed on the same side in the Y direction, access to both is simplified.

The lifting drive mechanism 37 includes the tensioning mechanisms 125. The tensioning mechanisms 125 are mechanisms that apply tension to the hanging belts 39 by urging the lower pulleys 123 downward. The tensioning mechanisms 125 are disposed between pairs of the connecting plates 29 (between the first plate 29A and the second plate 29B, and between the third plate 29C and the fourth plate 29D).

Figure 17:
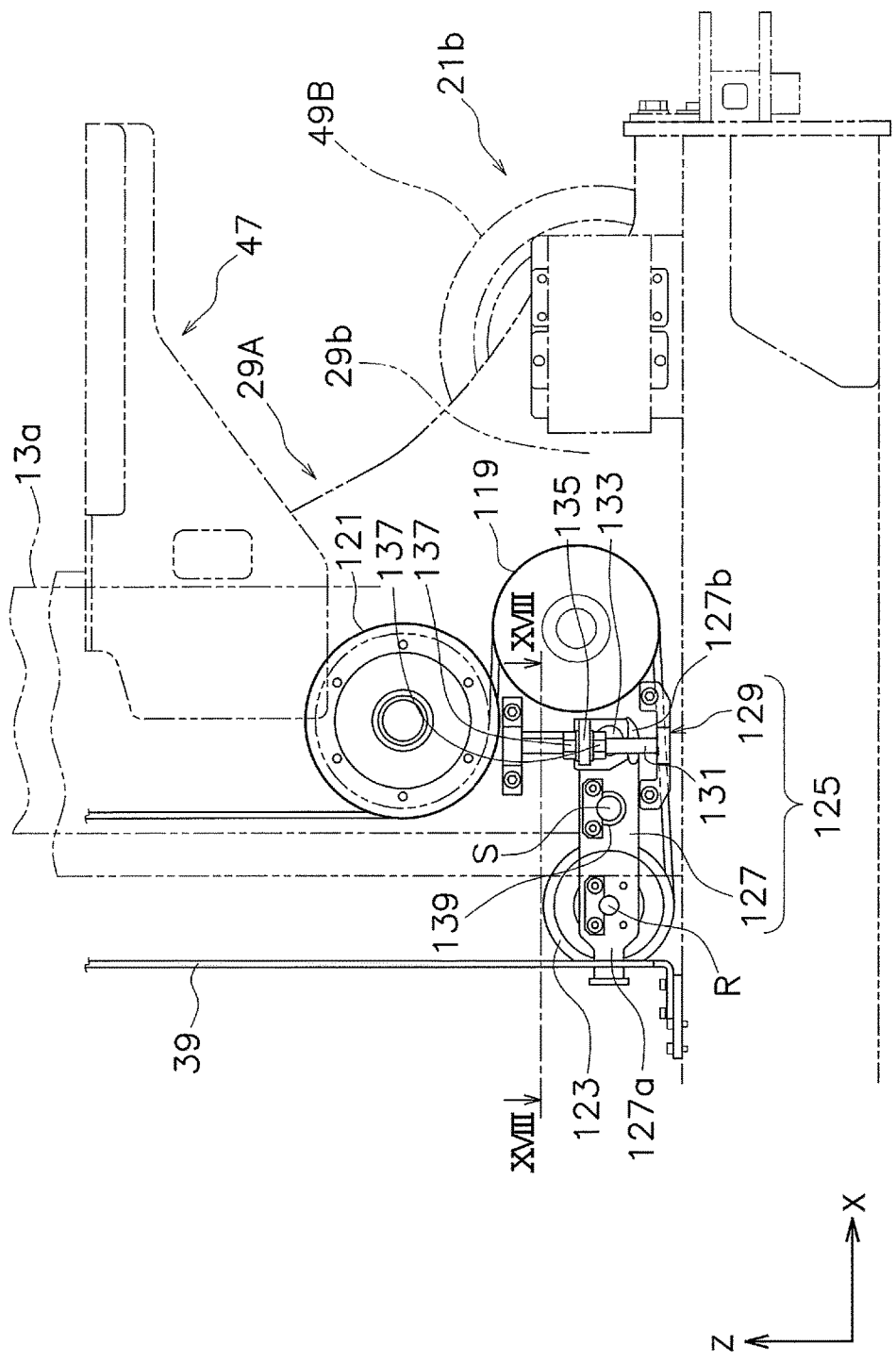
FIG. 17 is a front view of a tensioning mechanism.
Figure 18:
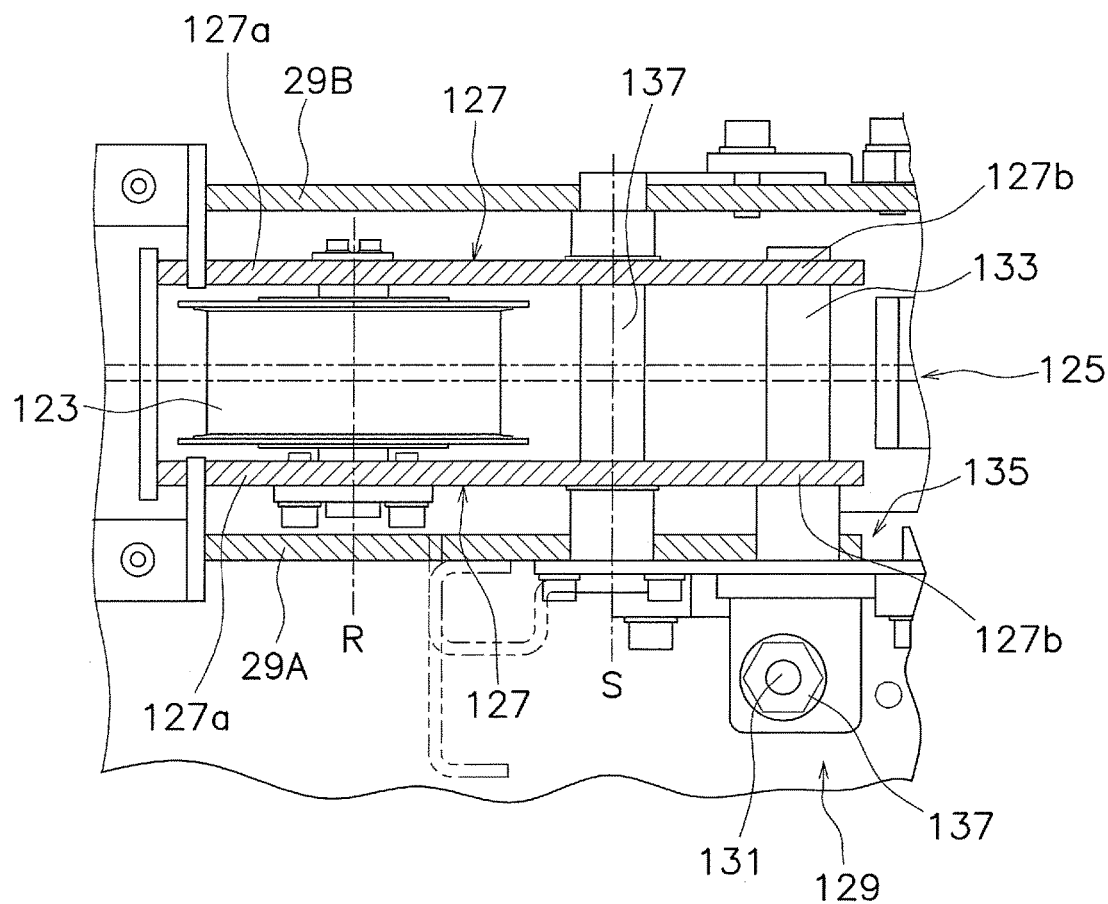
FIG. 18 is a cross sectional view taken along the line XVIII-XVIII in FIG. 17.
Figure 19:
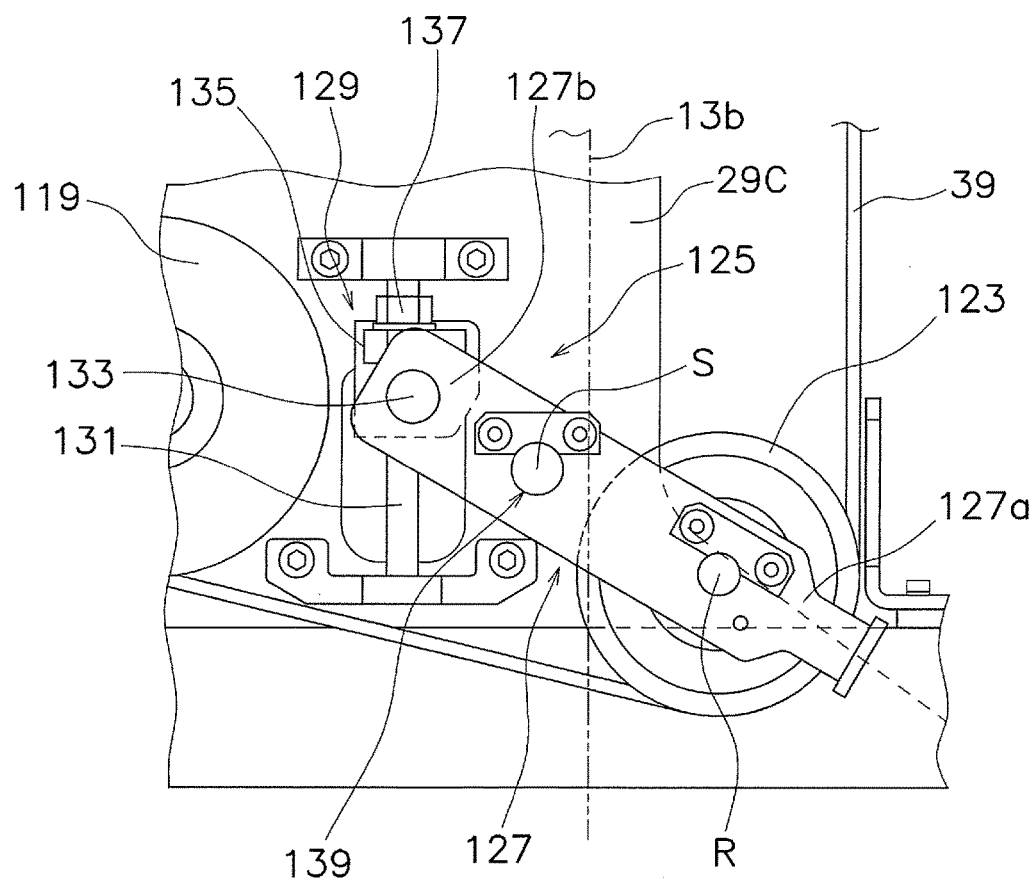
FIG. 19 is a partial front view of the tensioning mechanism.

As shown in FIG. 17, FIG. 18, and FIG. 19, the tensioning mechanism 125 includes the supporting members 127 and a supporting-member-fixing mechanism 129. The supporting members 127 are disposed between (in the Y direction) the first plate 29A and the second plate 29B. The supporting members 127 include a pair of plate members that rotationally support both ends of the rotary shaft of the lower pulley 123. The supporting members 127 extend long in the X direction, and the lower pulley 123 is rotationally supported by a first end portion 127a.

The supporting members 127 include an intermediate portion that is pivotably supported around a fulcrum S with respect to the connecting plates 29. Specifically, the fulcrum S is implemented by virtue of both ends of a pin 139—the pin 139 extending in the Y direction and being fixed to the supporting members 127 in the vicinity of the middle of the supporting members 127 in the X direction—being rotationally supported by the connecting plates 29. Thus, the supporting members 127 are pivotable around the fulcrum S, which is spaced apart from the center of rotation of the lower pulley 123 in the X direction. Specifically, the supporting members 127 include the first end portions 127a and second end portions 127b, which are portions disposed on both sides of the fulcrum S. The first end portions 127a rotationally support the lower pulley 123, and the second end portions 127b are positioned by the supporting-member-fixing mechanism 129.

Furthermore, the first end portions 127a of the supporting members 127 are portions that extend on one side of the fulcrum S in the X direction, and one point of each of the first end portions 127a is a support portion that supports the lower pulley 123. In addition, the second end portions 127b are portions that extend on the opposite side of the fulcrum S in the X direction, and one point of each of the second end portions 127b is a supported portion that is supported and fixed by the supporting-member-fixing mechanism 129.

The supporting-member-fixing mechanism 129 is a mechanism that determines the tension applied to the hanging belt 39 by fixing the attitude of the supporting members 127. Specifically, the supporting-member-fixing mechanism 129 pivots the supporting members 127 by changing the position of the second end portions 127b of the supporting members 127 in the up and down direction, and thus changes the position of the first end portions 127a of the supporting members 127, namely, the position of the lower pulley 123. Furthermore, the supporting-member-fixing mechanism 129 fixes the attitude of the supporting members 127 by fixing the position of the second end portions 127b of the supporting members 127 in the up and down direction.

The objects to which the supporting-member-fixing mechanisms 129 are attached are the first plate 29A and the third plate 29C. That is, the connecting plates to which the lifting drive motors are mounted and the connecting plates to which the supporting-member-fixing mechanisms are provided are different. In particular, the supporting-member-fixing mechanisms 129 are disposed on the same side in the Y direction, and therefore access to both is simplified.

Each supporting-member-fixing mechanism 129 includes a screw member 131, a pin 133, a linking member 135, and two nuts 137. The screw member 131 extends in the Z direction and is fixed to, for example, the first plate 29A in the vicinity of the second end portions 127b of the supporting members 127. The pin 133 extends in the Y direction from the second end portions 127b of the supporting members 127, specifically, toward the screw member 131. The linking member 135 includes a portion that rotationally supports the pin 133 and a plate-shaped portion wherein a hole through which the screw member 131 passes is provided. The two nuts 137 are screwed onto the screw member 131 and disposed on both sides of the plate-shaped portion of the linking member 135 in the Z direction.

Based on the above structure, if, for example, the two nuts 137 are moved to the upper side in the Z direction, then, as shown in FIG. 19, the second end portions 127b of the supporting members 127 move upward via the linking member 135 and the pin 133 and, attendant therewith, the support members 127 pivot around the fulcrum S due to the pin 139. As a result, the first end portions 127a of the supporting members 127 move to the lower side in the Z direction. Attendant therewith, the lower pulley 123 also moves to the lower side in the Z direction, and the Z directional position of the lower pulley 123 changes to the lower side of the Z directional position of the drive pulley 119.

Furthermore, the operation of the two nuts 137 is capable of being performed from an opening 29f (refer to FIG. 6 and FIG. 9) formed in the first plate 29A, which serves as a sidewall. Thus, by virtue of being disposed between (in the Y direction) the pairs of connecting plates 29 (e.g., the first plate 29A and the second plate 29B), the hole of each of the tensioning mechanisms 125 is able to be made compact, and the operation of adjusting the connecting plates 29 is able to be performed from the outer sides (the outer sides in the Y direction) of the pairs of connecting plates 29, which makes for good ease of operation.

Thus, in each tensioning mechanism 125, the supporting members 127 are pivoted to change the position of the lower pulley 123 for the purpose of applying tension to the hanging belt 39. Furthermore, the fulcrum S of the pivoting of the supporting members 127 that support the lower pulley 123 is at a position spaced apart from a center of rotation R of the lower pulley 123 in the horizontal direction. Based on the above structure, the tensioning mechanism 125 is a compact structure in the Z direction. For example, only space for a margin of adjustment should be provided in the first mast 13a and the second mast 13b. That is, dead space inside the first mast 13a and the second mast 13b does not become large. In addition, because a tension adjusting mechanism is not disposed in the up and down direction of the lower pulley 123, the most lowered position of the lift platform 15 is made sufficiently low.

As shown in FIG. 4, FIG. 7, FIG. 17, and FIG. 19, the fulcrum S of the supporting members 127 preferably is disposed at a position that overlaps the first mast 13a or the second mast 13b in a plan view. In addition, at least a portion of the lower pulley 123 is disposed at a position that is shifted, to the lift platform 15 side, from the position that overlaps the first mast 13a or the second mast 13b in a plan view. More specifically, in the state shown in FIG. 17, the whole lower pulley 123 is completely shifted from the first mast 13a or the second mast 13b; in the state shown in FIG. 19, a portion of the lower pulley 123 overlaps the first mast 13a or the second mast 13b but mostly is shifted. In other words, even if the lower pulley 123 is disposed most to the mast side, the lower pulley 123 does not move to a position at which it substantially or completely intrudes upon the mast in a plan view. Based on the above positional relationships, by setting the lower pulley 123 at a position shifted to the lift platform 15 side from the first mast 13a or the second mast 13b while disposing the fulcrum S of the supporting members 127 at the same position as the first mast 13a or the second mast 13b, the dead space inside the first mast 13a and the second mast 13b is made small.

In addition, because the structure that swivels the supporting members 127 is adopted, the load to apply tension is increased, even if the generated load is small, if the principle of the lever is used.

Furthermore, the number and positions of the idler pulleys are not limited to the above-described preferred embodiment. For example, the idler pulley may be provided on the side opposite the idler pulley in the above-described preferred embodiment with respect to the drive pulley, or may be provided on both sides of the drive pulley.

Space saving is achieved by the attachment of various mechanisms to the connecting plates 29. In particular, because the connecting plates 29 preferably are thin plate-shaped members whose principal surfaces face the Y direction (that is, they have no thickness in the Y direction), they are effective for space saving. In addition, because the connecting plates 29 are thin plate-shaped members, desirable shapes are implemented as needed.

In addition, the portions through which the first mast 13a and the second mast 13b are inserted preferably are located between the pairs of connecting plates 29. However, because the inner side surfaces of the connecting plates 29 in the Y direction are machined with high precision, the attitudes of the first mast 13a and the second mast 13b are more accurate.

In particular, because various mechanisms are provided on the connecting plates 29, there is no need to provide these mechanisms on the first mast 13a and the second mast 13b. As a result, the assembly process described below becomes possible.

Prepare the first lower frame 25a and the second lower frame 25b.

Produce the unit by assembling the various mechanisms onto the connecting plates 29 of the first lower frame 25a and the second lower frame 25b.

Transport the above-described unit and the masts to the site and assemble both on site. That is, because only the work of assembling the masts is performed onsite, working efficiency improves.

OTHER PREFERRED EMBODIMENTS

The description above explained preferred embodiments of the present invention, but the present invention is not limited to the above-described preferred embodiments, and it is understood that various modifications may be effected without departing from the spirit of the present invention. In particular, the preferred embodiments and modified examples description in the present specification can be combined arbitrarily as needed.

The present invention can be widely adapted to stacker cranes having a mast and a lower truck.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stacker crane that travels along a rail, comprising:
a first mast and a second mast spaced apart from one another in a travelling direction and extending vertically;
connecting plates including a plate-shaped first plate and a plate-shaped second plate mounted to a lower portion and both side surfaces, which face a crossing direction crossing the travelling direction, of the first mast, and a plate-shaped third plate and a plate-shaped fourth plate mounted to a lower portion and both side surfaces, which face the crossing direction, of the second mast, the first plate and the second plate each including an upper portion fixed to the first mast and a lower portion whose width in the travelling direction is greater than that of the upper portion, and the third plate and the fourth plate each including an upper portion fixed to the second mast and a lower portion whose width in the travelling direction is greater than that of the upper portion; and
a first lower hollow frame and a second lower hollow frame including a pair of hollow members disposed on outer sides of the connecting plates in the crossing direction on both sides of the first mast and the second mast in the crossing direction and extending in the travelling direction, the first lower hollow frame including a first end fixed to an outer side surface of the lower portion of the first plate in the crossing direction and a second end fixed to an outer side surface of the lower portion of the third plate in the crossing direction, and the second lower hollow frame including a first end fixed to an outer side surface of the lower portion of the second plate in the crossing direction and a second end fixed to an outer side surface of the lower portion of the fourth plate in the crossing direction;
a first travelling wheel unit including a first travelling wheel including both shaft ends rotatably supported by the first plate and the second plate, the first travelling wheel being configured to roll on an upper surface of the rail;
a second travelling wheel unit including a second travelling wheel including both shaft ends rotatably supported by the third plate and the fourth plate, the second travelling wheel being configured to roll on the upper surface of the rail; and
a drive wheel unit configured to contact a side surface of the rail.

2. The stacker crane according to claim 1, wherein
the first travelling wheel unit is disposed on a side opposite to the second mast with respect to the first mast; and
the second travelling wheel unit is disposed on a side opposite to the first mast with respect to the second mast.

3. The stacker crane according to claim 2, wherein
a notch that opens downward is provided in a lower portion of one of the connecting plates; and
the stacker crane further comprises a roller attached to the notch and configured to prevent the first lower hollow frame and the second lower hollow frame from floating up from the rail.

4. The stacker crane according to claim 2, further comprising:
a lift platform movable along the first mast and the second mast;
a belt attached to the lift platform; and
a lifting drive motor configured to drive the belt and mounted in a state tilted with respect to one of the connecting plates.

5. The stacker crane according to claim 2, further comprising:
a controller; and
a support member, to which the controller is attached, fixed to one of the connecting plates.

6. The stacker crane according to claim 1, wherein the drive wheel unit includes a pair of first drive wheels provided at the first ends of the first lower hollow frame and the second lower hollow frame, and a pair of second drive wheels provided at the second ends of the first lower hollow frame and the second lower hollow frame.

7. The stacker crane according to claim 1, wherein
a notch that opens downward is located in a lower portion of one of the connecting plates; and
the stacker crane further comprises a roller attached to the notch and configured to prevent the first lower hollow frame and the second lower hollow frame from floating up from the rail.

8. The stacker crane according to claim 1, further comprising:
a lift platform movable along the first mast and the second mast;
a belt attached to the lift platform; and a lifting drive motor configured to drive the belt and mounted in a state tilted with respect to one of the connecting plates.

9. The stacker crane according to claim 1, further comprising:
a controller; and
a support member, to which the controller is attached, fixed to one of the connecting plates.

* * * * *